(12) United States Patent
Brown et al.

(10) Patent No.: US 7,377,472 B2
(45) Date of Patent: May 27, 2008

(54) PIPE AND CABLE HOLDER

(75) Inventors: Larry D. Brown, San Diego, CA (US); Dennis L. Hart, Incline Village, NV (US)

(73) Assignee: Securus, Inc., Vista, CA (US)

( * ) Notice: Subject to any disclaimer, the term of this patent is extended or adjusted under 35 U.S.C. 154(b) by 47 days.

(21) Appl. No.: 10/734,953

(22) Filed: Dec. 12, 2003

(65) Prior Publication Data
US 2005/0006535 A1    Jan. 13, 2005

Related U.S. Application Data

(60) Provisional application No. 60/433,827, filed on Dec. 16, 2002.

(51) Int. Cl.
*F16L 3/08*    (2006.01)
(52) U.S. Cl. .................. 248/74.1; 248/68.1; 248/74.4; 24/16 R; 24/271
(58) Field of Classification Search ............... 248/68.1, 248/74.1, 74.4; 24/271, 16 R
See application file for complete search history.

(56) References Cited

U.S. PATENT DOCUMENTS

| | | |
|---|---|---|
| 1,129,553 A | 2/1915 | Cope |
| 2,354,919 A | 8/1944 | Lockwood |
| 3,128,073 A | 4/1964 | Berlyn |
| 3,147,754 A * | 9/1964 | Koessler ............... 128/885 |
| 3,188,030 A | 6/1965 | Fischer |
| D212,505 S | 10/1968 | Guerrero et al. |
| 3,944,175 A | 3/1976 | Kearney |
| 4,051,035 A | 9/1977 | Boschen et al. |
| 4,244,083 A * | 1/1981 | Aremka et al. ........... 24/16 R |
| 4,252,466 A * | 2/1981 | Berti et al. ............... 405/172 |
| D269,155 S | 5/1983 | Rose |
| 4,395,009 A | 7/1983 | Bormke |
| 4,555,589 A | 11/1985 | Osada |
| 4,562,982 A | 1/1986 | McSherry et al. |
| 4,655,023 A | 4/1987 | Yung |
| 4,679,754 A | 7/1987 | Richards |
| 4,766,651 A | 8/1988 | Kobayashi et al. |
| D299,213 S | 1/1989 | Puntillo |
| 4,899,963 A | 2/1990 | Murphy |
| 4,905,942 A | 3/1990 | Moretti |
| 4,993,669 A | 2/1991 | Dyer |
| 5,002,244 A | 3/1991 | Holbury et al. |
| 5,131,613 A | 7/1992 | Kamiya et al. |
| 5,149,026 A | 9/1992 | Allen |
| 5,303,887 A | 4/1994 | Hasty et al. |
| 5,367,127 A | 11/1994 | Dormon |
| 5,598,995 A | 2/1997 | Meuth et al. |

(Continued)

*Primary Examiner*—Amy J. Sterling
*Assistant Examiner*—Tan Le
(74) *Attorney, Agent, or Firm*—Stetina Brunda Garred & Brucker

(57) ABSTRACT

A clamp assembly releasably secures a plumbing pipe to a support. The assembly has a clamp base releasably connected to a clamping block by pawls that releasably engage a pair of ratchet arms extending from the base. Each of the base and clamping block has two inclined surfaces forming a generally V-shaped notch that opens toward the pipe. A cap is optionally placed over one or both of the V-shaped notches and is interposed between the notch and the pipe. At least one resilient leg or a flange may extend from the base opposite the ratchet arms, with the flange and/or the arms resiliently engaging opposite sides of the support to hold the clamp assembly in position.

42 Claims, 18 Drawing Sheets

U.S. PATENT DOCUMENTS

| | | |
|---|---|---|
| 5,655,738 A | 8/1997 | Ragsdale et al. |
| 5,876,000 A | 3/1999 | Ismert |
| D408,273 S | 4/1999 | Senninger |
| 6,126,122 A | 10/2000 | Ismert |
| 6,129,317 A | 10/2000 | Rodrigues et al. |
| 6,446,915 B1 * | 9/2002 | Ismert ........................ 248/68.1 |
| 6,463,631 B2 * | 10/2002 | Noda .......................... 24/16 R |
| 6,464,181 B2 * | 10/2002 | Sakakura .................... 248/68.1 |
| 2005/0006535 A1 * | 1/2005 | Brown et al. .................. 248/70 |

* cited by examiner

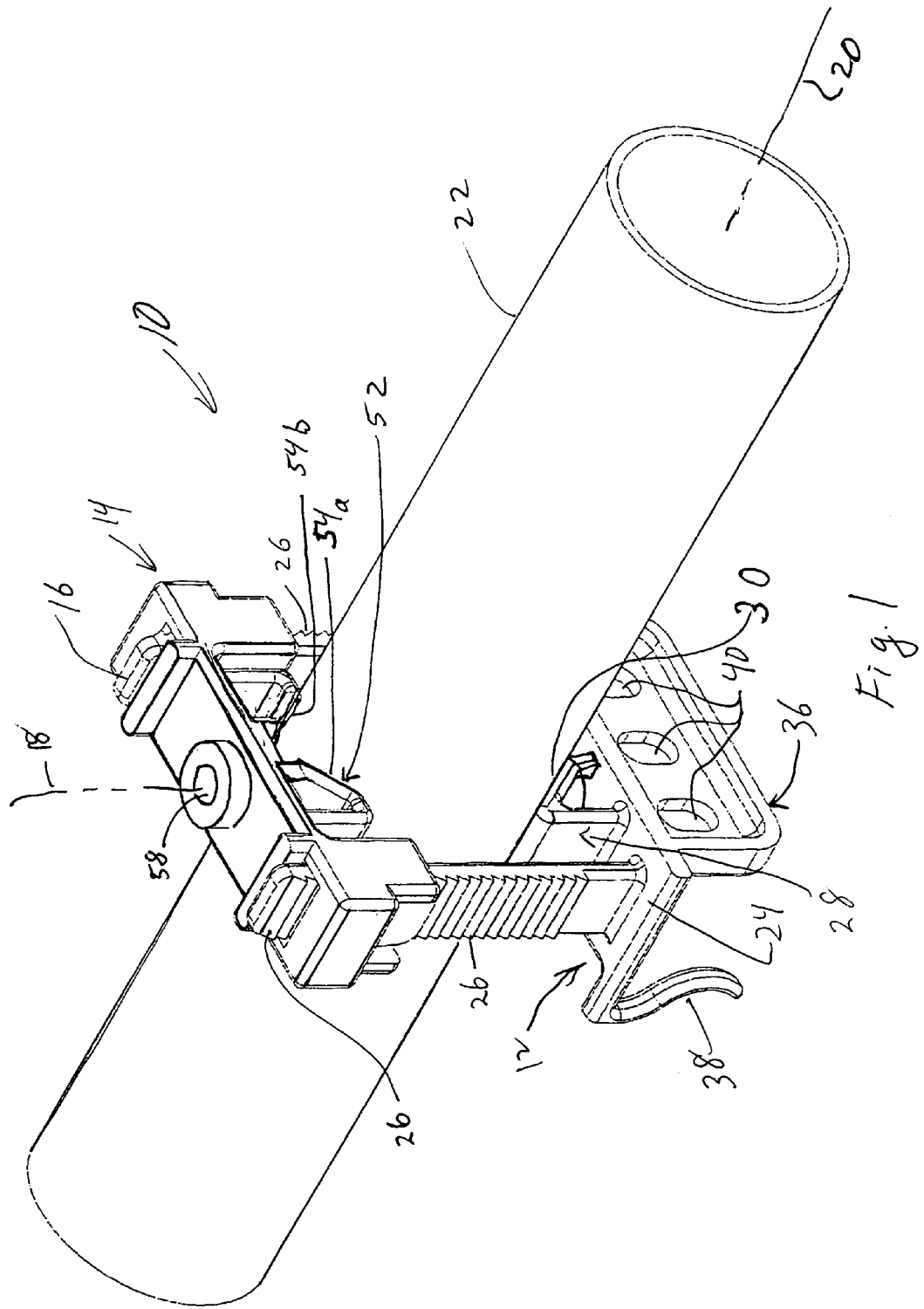

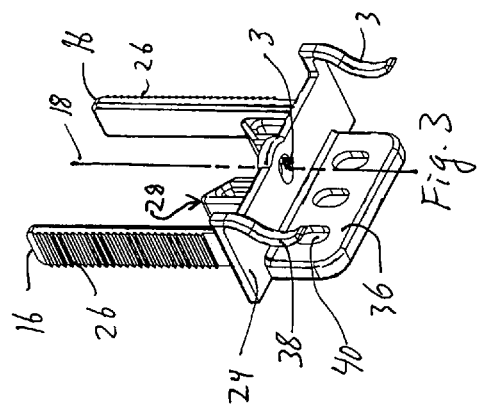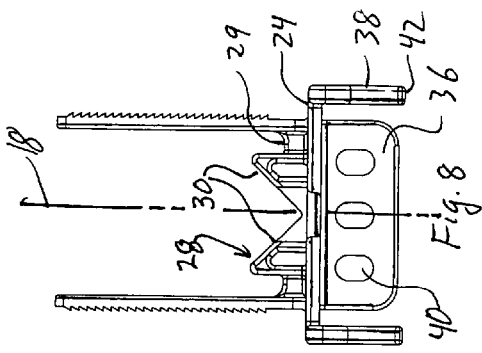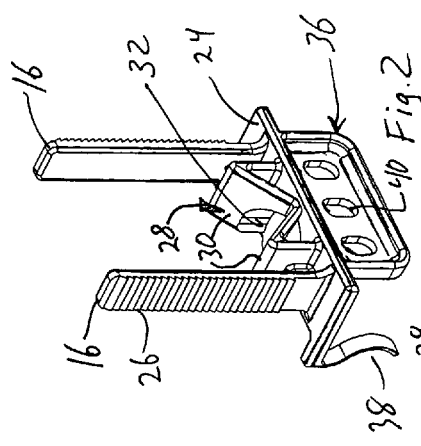

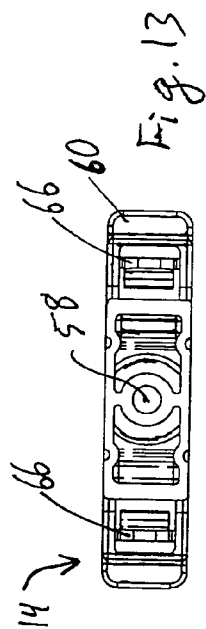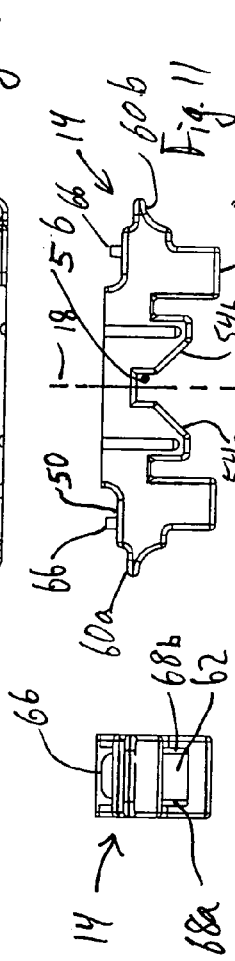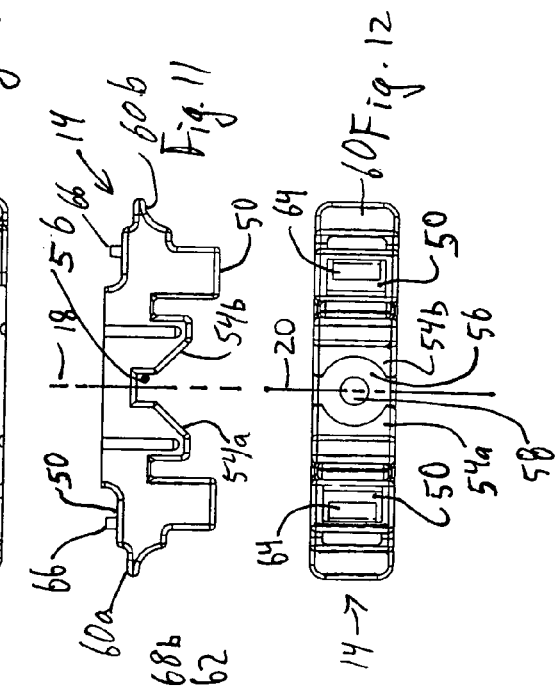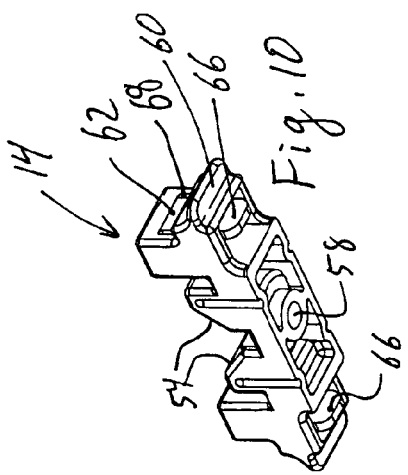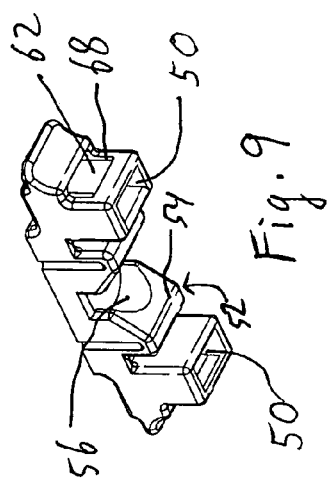

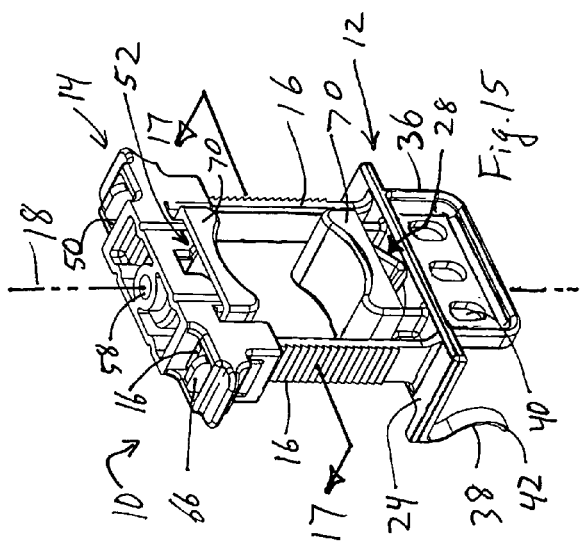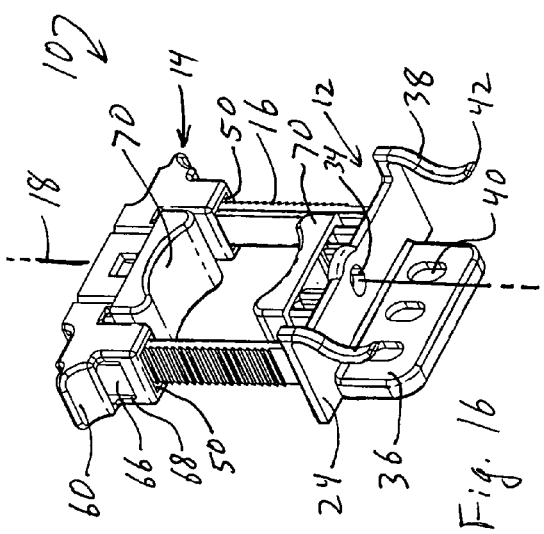

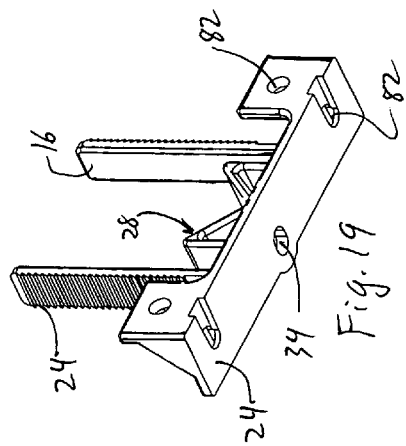
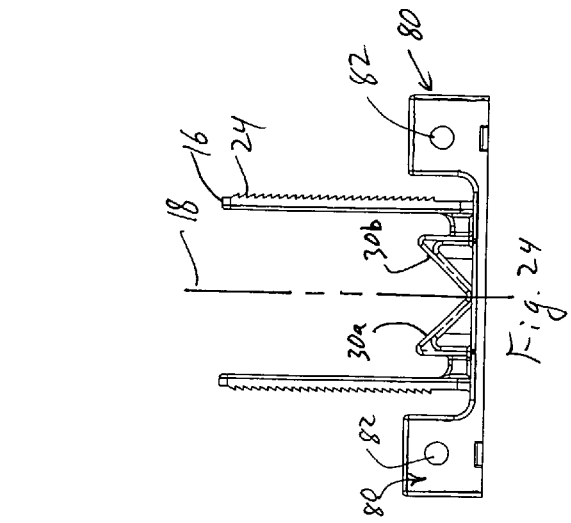
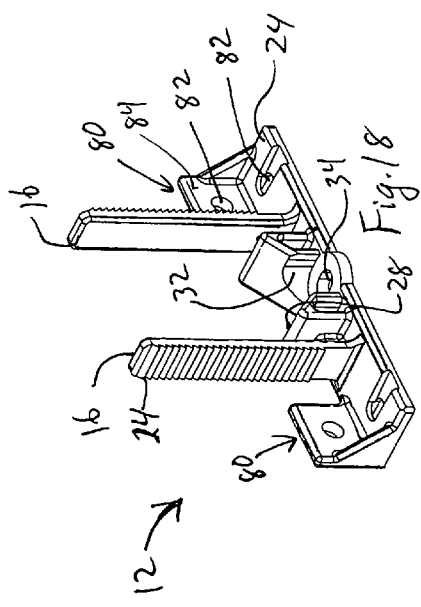
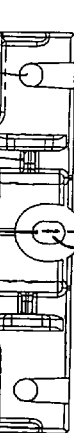
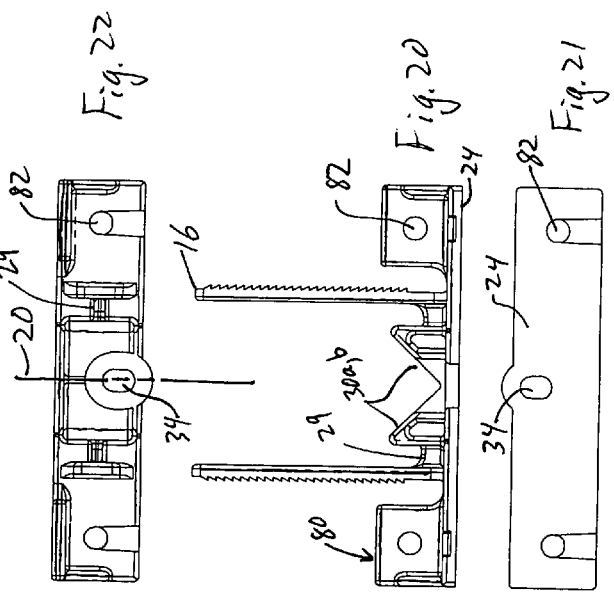
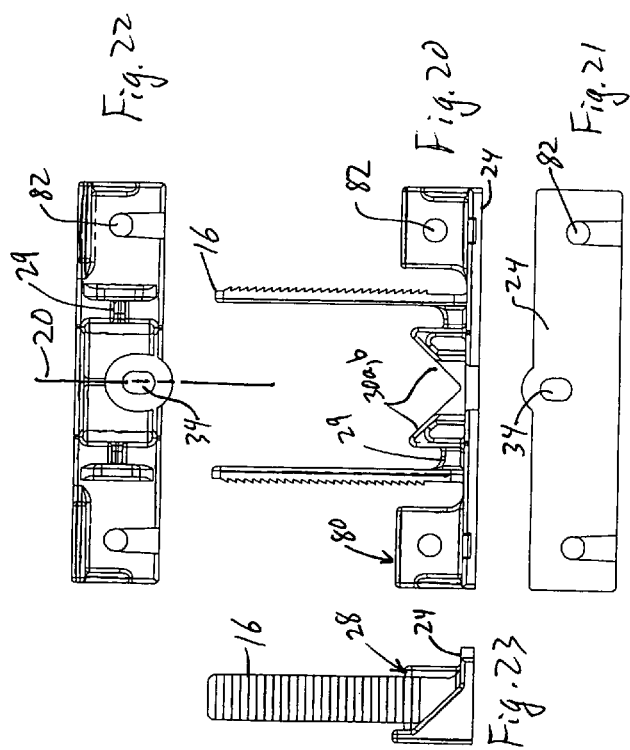

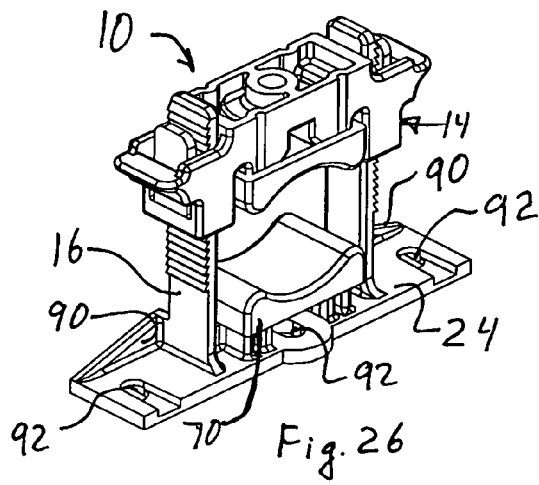
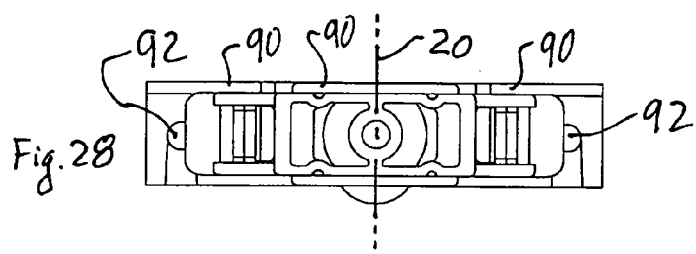
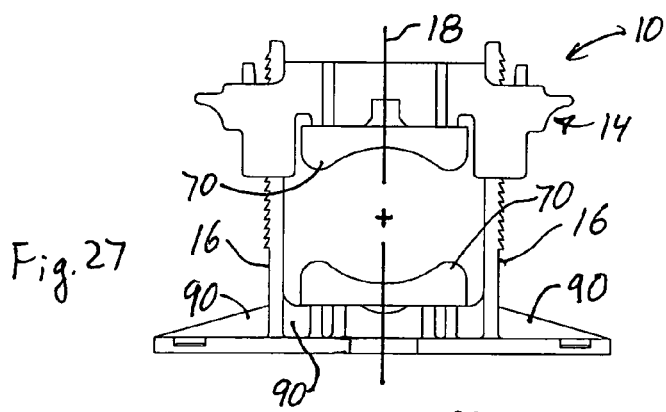
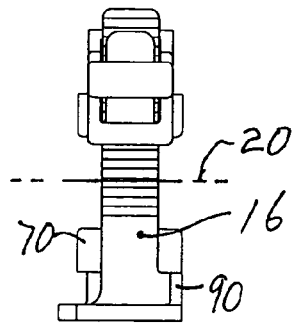
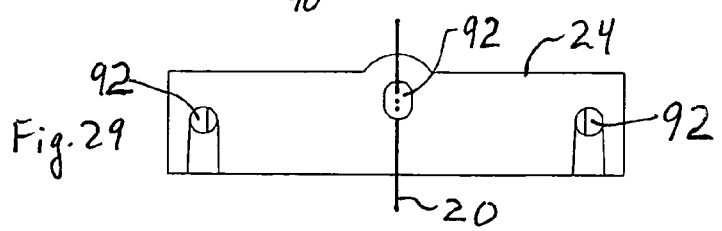

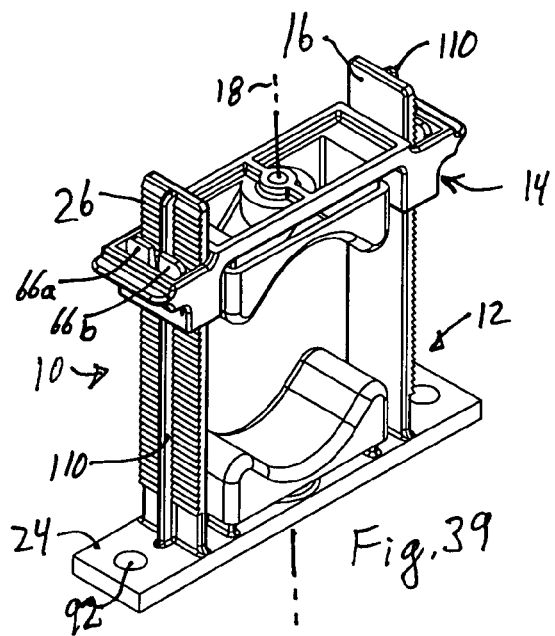
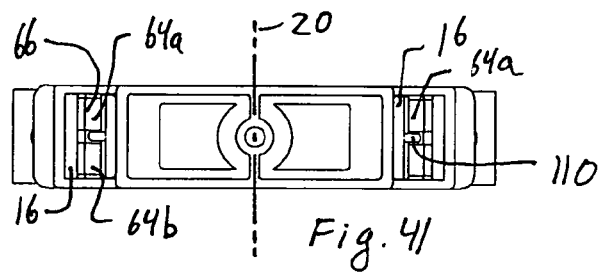
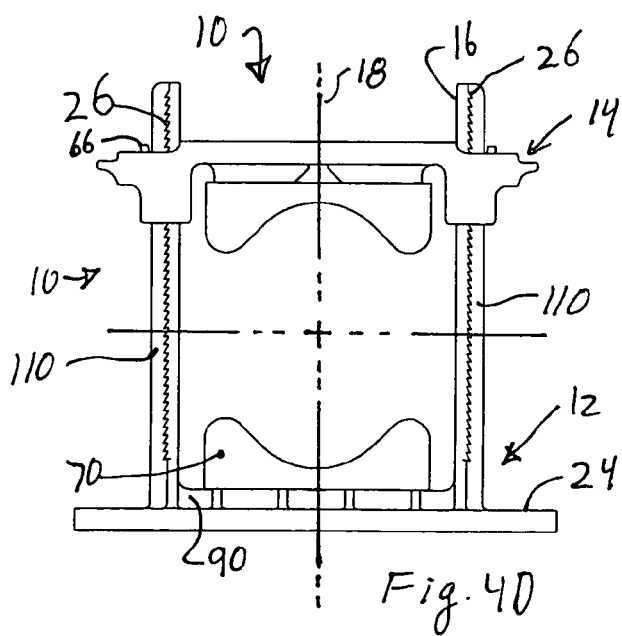
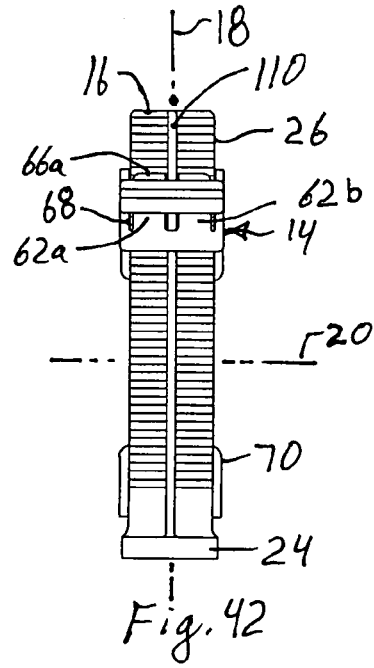

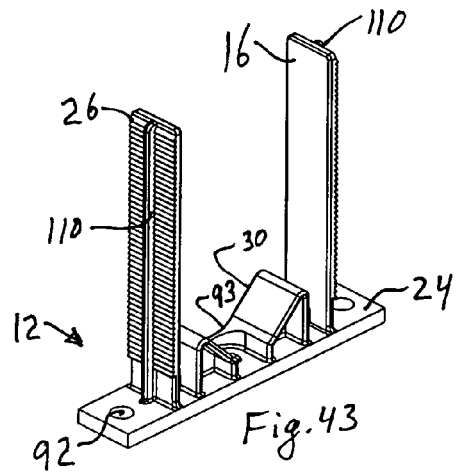
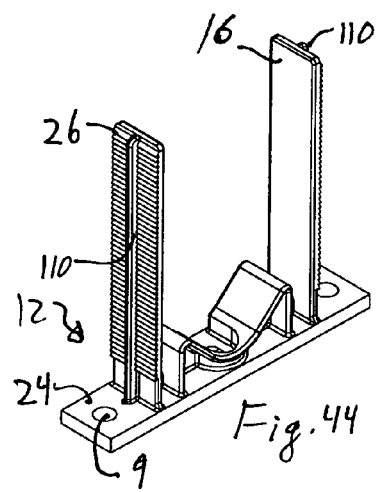
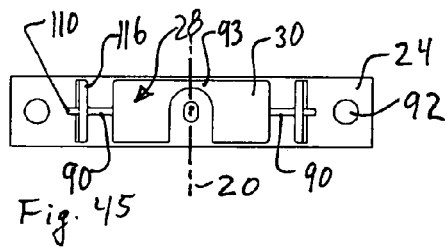
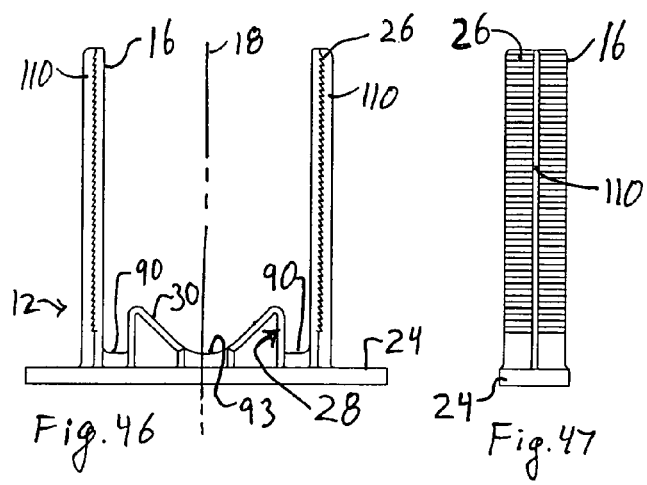
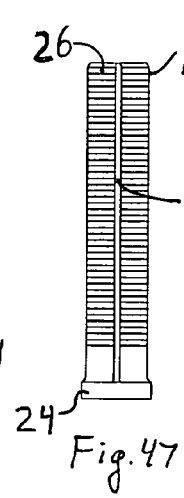
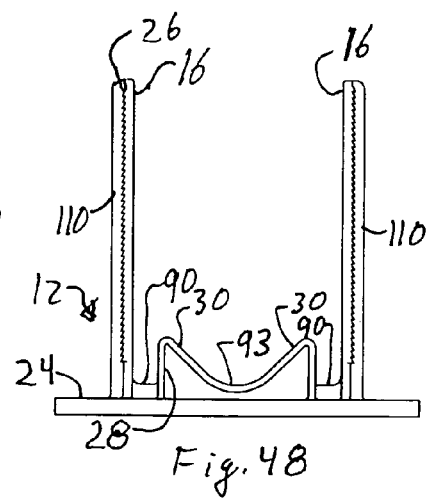

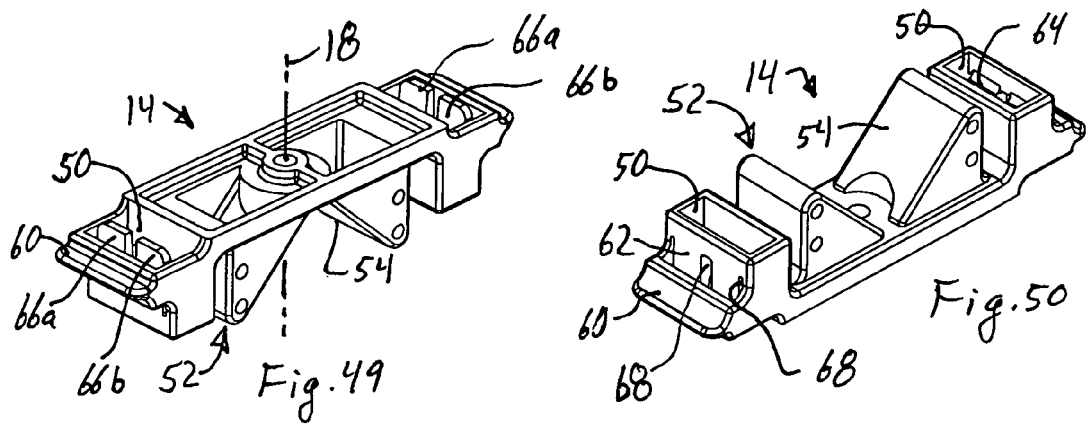
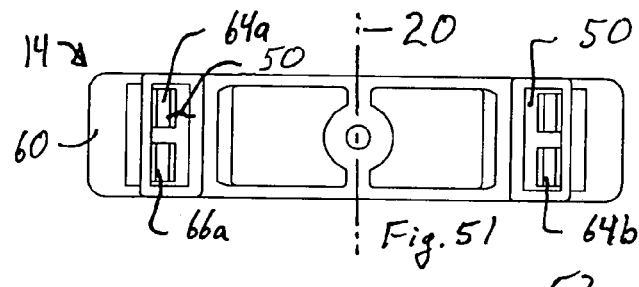
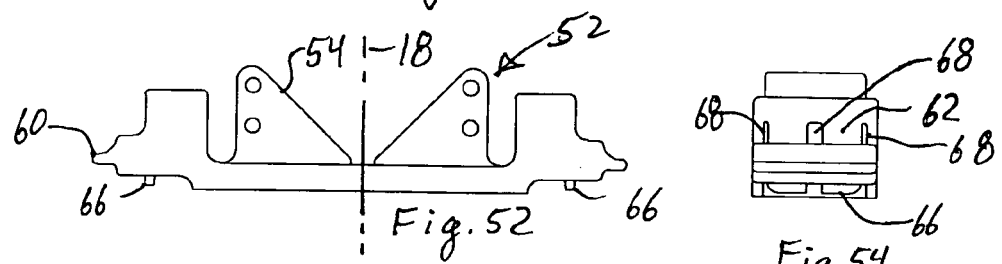
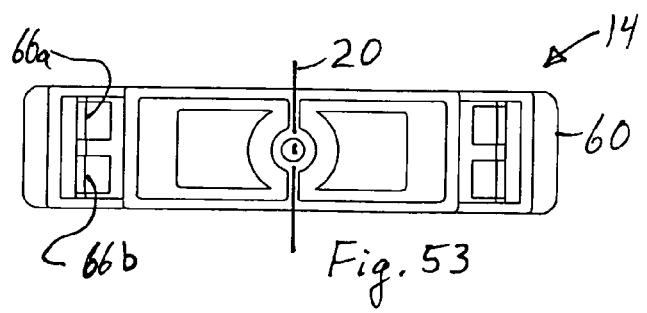
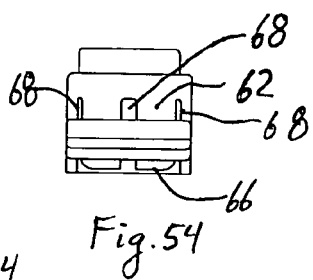

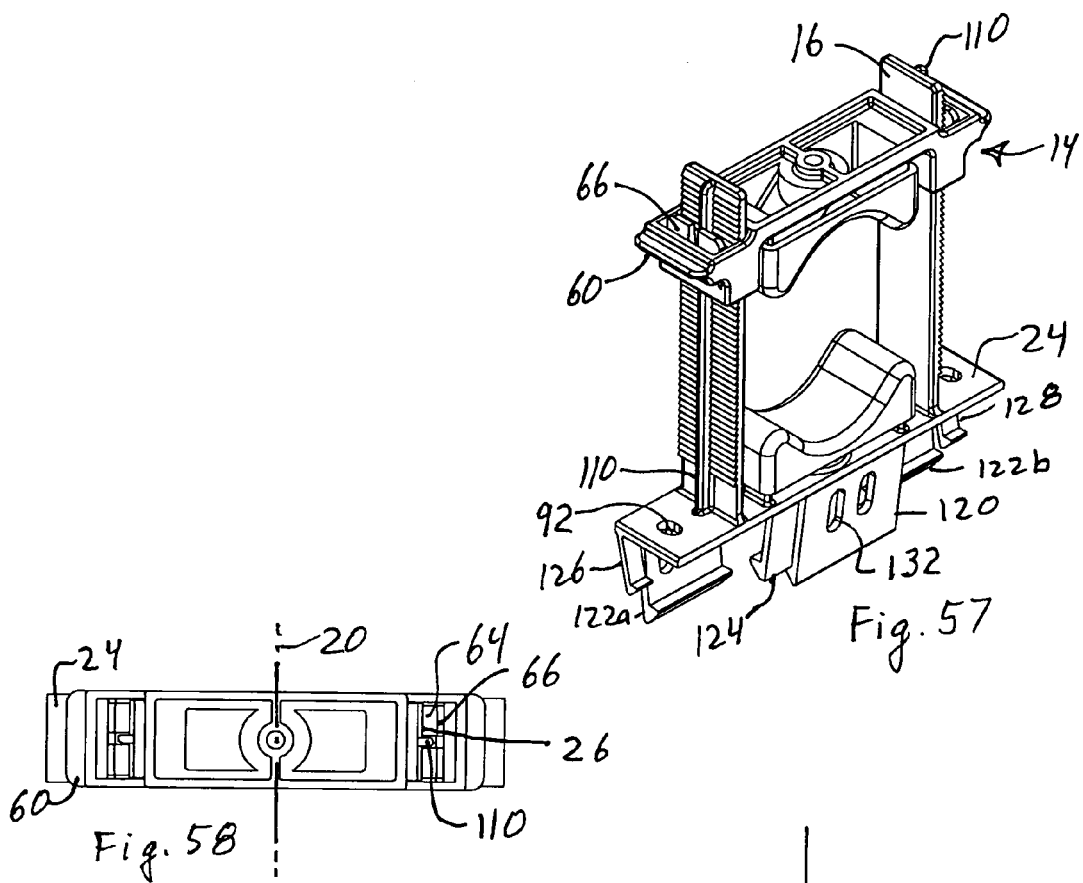
Fig. 57
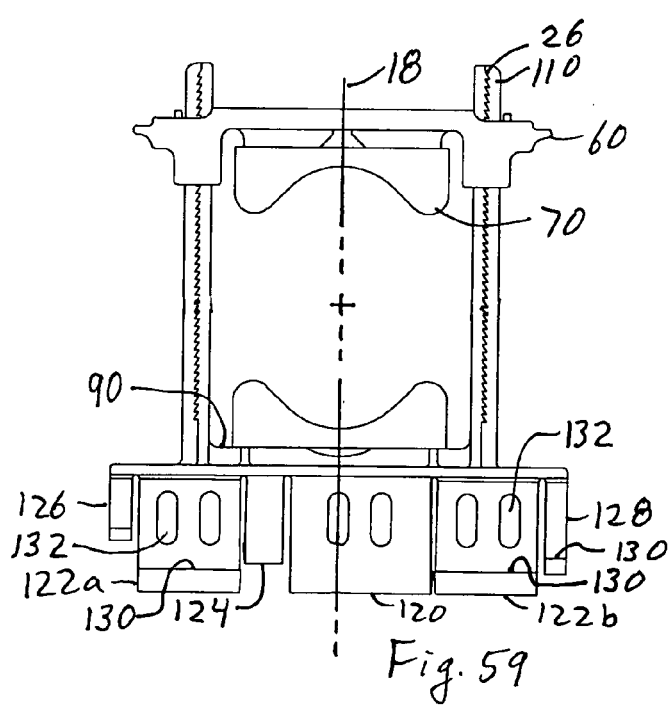
Fig. 58
Fig. 59
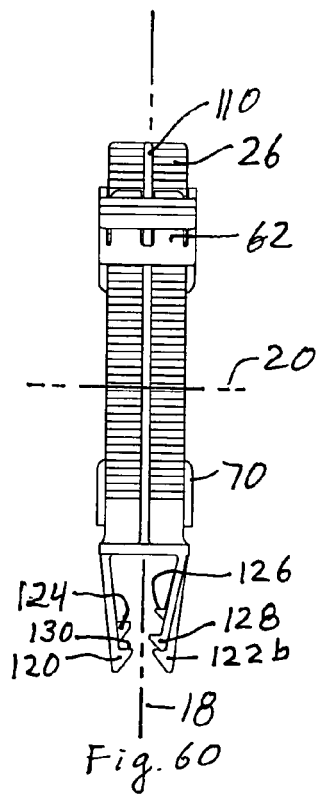
Fig. 60

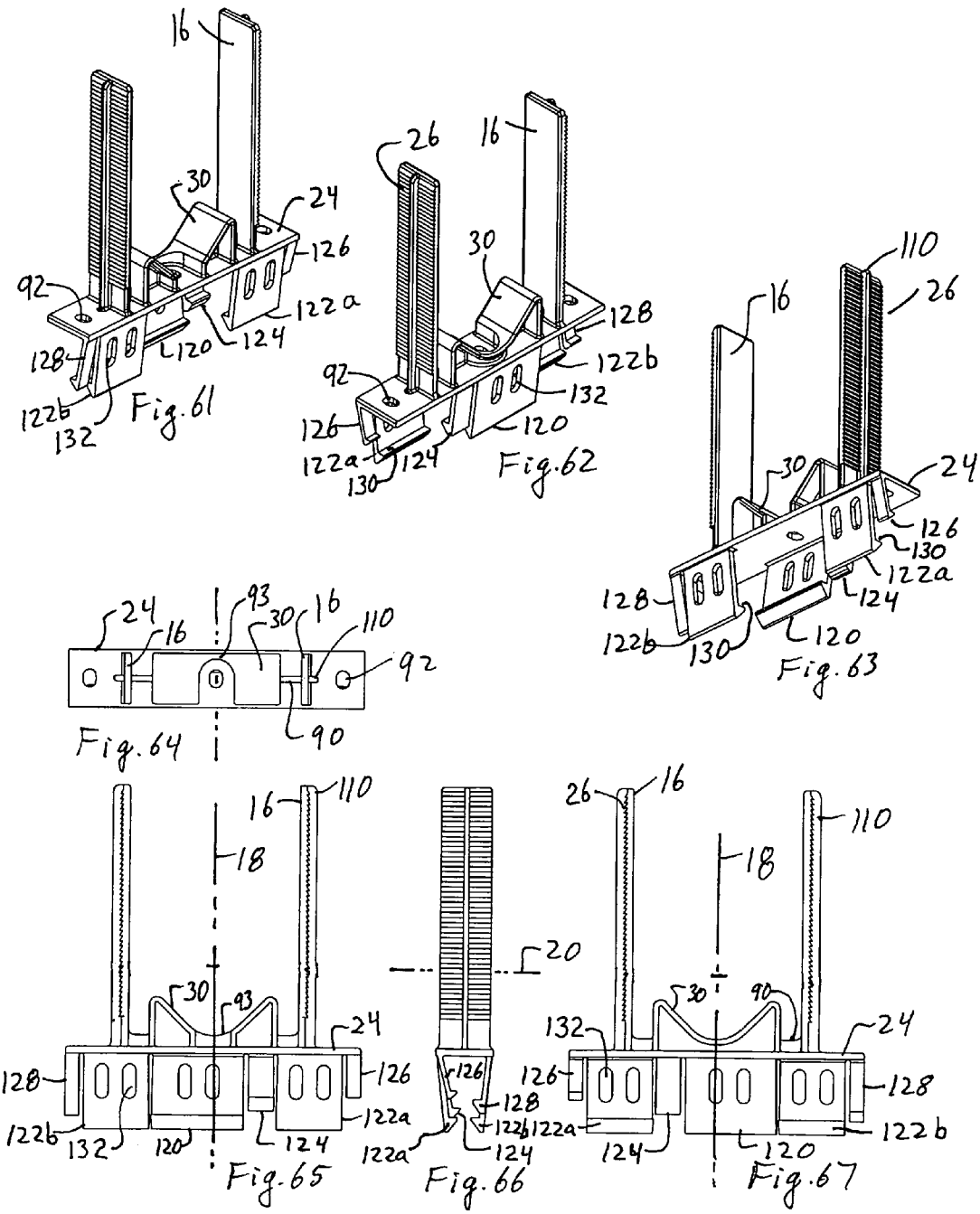

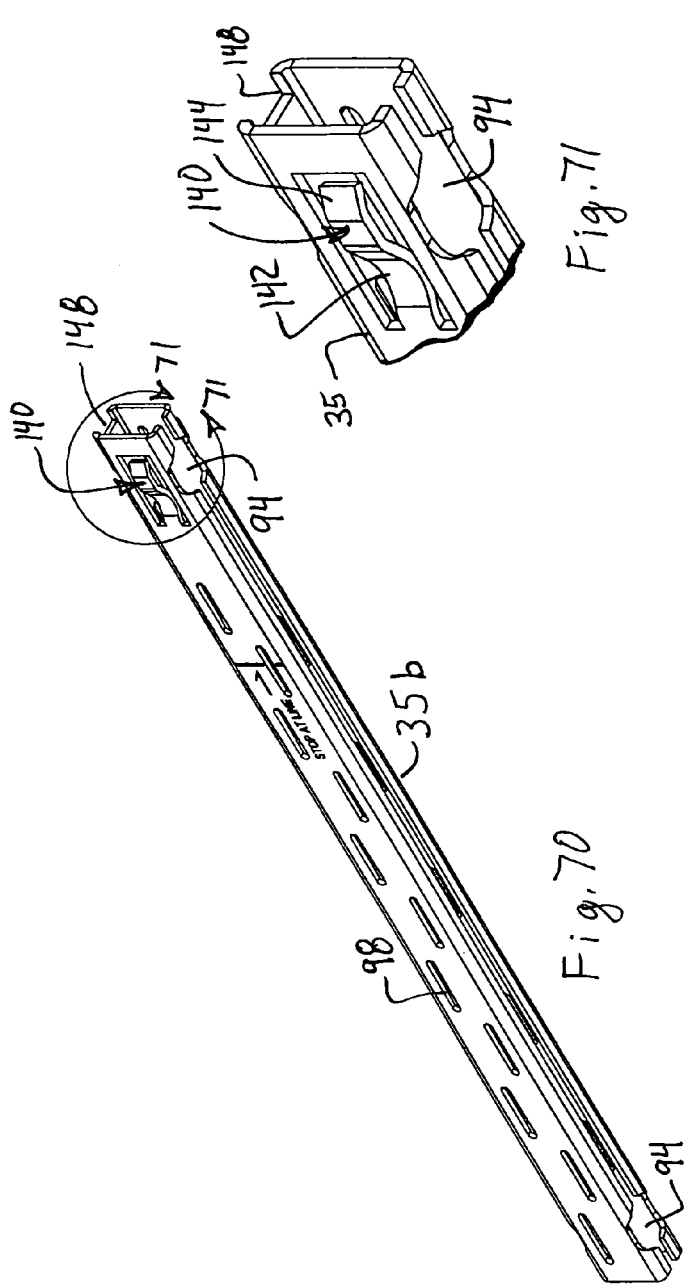
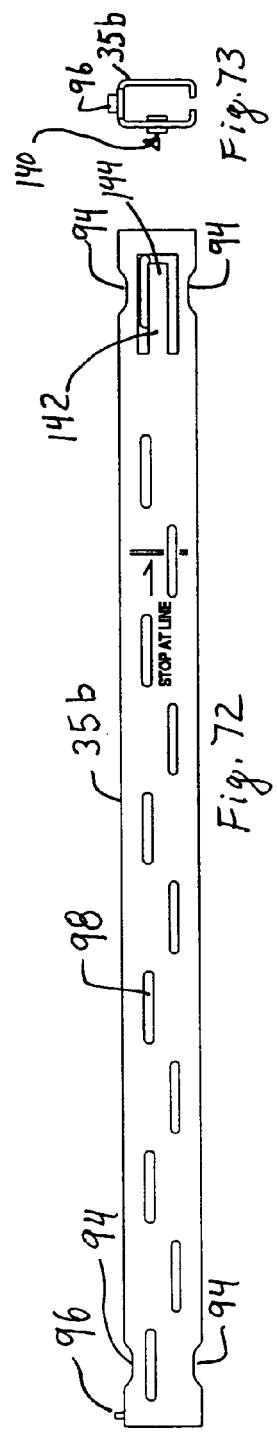

PIPE AND CABLE HOLDER

CROSS-REFERENCE TO RELATED APPLICATION

This application claims the benefit of U.S. Provisional Application No. 60/433,827 filed Dec. 16, 2002, the entire content of which is hereby incorporated by reference.

FIELD OF THE INVENTION

This invention relates to brackets used to hold and position elongated items such as cables and pipes.

BACKGROUND

A variety of brackets and clamps are used to hold pipes, cables, wires, and other elongated members in position. A clamp developed by Ismert is disclosed in U.S. Pat. No. 6,126,122, which has two parallel ratchet arms extending from a base to engage slots in a keeper block. The keeper block has a pawl member located by the slots to engage teeth on the ratchet arms to adjustable position the base relative to the keeper block. V-shaped notches on the base and notch open toward each other and allow various diameter pipes, cables, etc. to be held in the notches.

But these notches form a relatively rigid connection with the item held by the clamp, and with that connection occurring along a point or line contact. The connection is so rigid that the Ismert clamp even adds elongated slots to try and make the sides of the V-shaped notches more flexible. Those rigid connections have disadvantages, including creating a point or line contact between the item held and the V-shaped notches or other portions of the holders, potential scraping of the item held, and easy sliding of the item held relative to the bracket. This type of prior art clamp also readily transmits noise from the pipe through the bracket, to the supporting structure. If the brackets hold water pipes, the water flowing through the pipes creates noise that is transmitted through the bracket into the structure, and that presents problems in multi-family dwellings. There is thus a need for a clamp that has a more flexible support contacting the item held, and there is a need for a clamp that does not transmit noise to the supporting structure to which the bracket is fastened.

These brackets and clamps are fastened to a variety of support structures, such as studs in a wall, bars fastened between or to such studs, and cables or pipes. The prior art clamps and brackets are difficult to fasten to these various support structures. One hand is needed to hold the bracket, while the other hand must place a screw or nail through the bracket and then try to fasten the screw or nail. There is thus a need for a better or easier way to fasten these brackets and clamps with only one or two hands, and to allow fastening the brackets in various orientations.

SUMMARY

Briefly described, a clamp assembly releasably secures a plumbing pipe to a support, although the securement could also be permanent. The assembly has a clamp base releasably connected to a clamping block by a latching mechanism, preferably by a pawl that releasably engages at least a pair of ratchet arms extending from the base. Each of the base and clamping block has two inclined surfaces forming generally V-shaped notches that open toward the pipe. A resilient cap is placed over each of the V-shaped notches and is interposed between the notches and the pipe. A resilient leg and a flange extend from the base opposite the ratchet arms, with the flange and arms engaging opposite sides of the support. The resilient leg and flange can be placed on either the clamp base or the clamping block to temporarily hold either part to the support while the part is more securely fastened, as for example, by placing screws through holes in the part to screw it to the support. The caps advantageously dampen acoustic noise from the pipe.

There is thus advantageously provided clamp assembly for securing an elongate member having a longitudinal axis to a support. The assembly includes a clamp base having at least a pair of ratchet arms extending outward from the base. Each ratchet arm advantageously has a plurality of ratchet teeth formed along at least one surface thereof. The arms are generally parallel. The base has a first support for the elongate member that includes at least two inclined surfaces forming a generally V-shaped notch that opens in the same direction the arms extend.

The clamping block has openings with each opening being sized and located to receive one of the ratchet arms. The clamping block also has at least one pawl located in each opening, the at least one pawl having at least one pawl tooth with the pawl located and configured to releasably engage the ratchet teeth when the ratchet arm extends into the opening a distance sufficient to engage the at least one pawl tooth. The clamping block also has a second support for the elongate member and that support includes at least two inclined surfaces forming a generally V-shaped notch that opens toward the clamp base when the ratchet arms are inserted into the openings.

Preferably, but optionally, at least one cap is sized and configured to be placed over the two inclined surfaces forming at least one of the V-shaped notches. The cap extends over that notch and is interposed between the inclined surfaces and the elongate member during use of the clamp assembly. The cap advantageously, but optionally, comprises a flexible cap forming a curved surface in the notch. A cap is preferably, but optionally placed on each of the clamp base and the clamping block. Advantageously, the cap is made of a material having a hardness of about 40-60 Shore A. Preferably, but optionally, the cap is removable. Ideally, the cap is selected to dampen acoustic noise from the pipe or elongated member held by the clamp assembly.

The clamp assembly can also optionally include a first hole extending through the clamp base, with the first hole being located between the inclined surfaces of the base and sized to allow the passage of a fastener to fasten the base to the structural support during use of the clamp assembly. Further, the clamp assembly can optionally include a second hole extending through the clamping block, with the second hole being located between the inclined surfaces of the clamping block and sized to allow the passage of a fastener to fasten the clamping block to the structural support during use of the clamp assembly. Advantageously, but optionally, the first and second holes are co-axial. Still further, the clamp assembly can optionally include a third hole extending through the clamp base and not located between the inclined surfaces, the third hole being sized to allow the passage of a fastener to fasten the clamp base to the structural support during use of the clamp assembly.

The clamp assembly can also optionally include at least one resilient leg and a flange each extending from the clamp base in a direction opposite the ratchet arms. The flange and arms are spaced apart a distance sufficient to allow the leg to resiliently engage the support when the flange abuts the support, during use of the clamp assembly. Preferably there are two legs on opposing sides of the orthogonal axis cooperating with the flange to apply symmetrical loads to the support and to hold the base to the support without a tendency to twist the base on the support. In further embodiments, the flange and leg can extend from the clamping block rather than extend from the clamping base. Optionally, the flange or leg has at least one opening therethrough which opening is sized to allow passage of a fastener to fasten the flange or leg to the support during use of the clamp assembly. Advantageously, but optionally, the leg has a distal end that is directed away from the flange to facilitate installation onto the support.

In a further variation, the clamp assembly can have at least one flange at right angles to the base and extending toward the arms. In this further variation, there is advantageously, but optionally, at least one hole in the at least one flange sized to allow passage of a fastener to fasten the base to the support during use of the clamp assembly.

In a still further variation, each pawl is formed by two adjacent slots in a wall in the clamping block. The wall defines a portion of the opening in which the pawl is located. The slots preferably extend to and open onto a distal edge of the clamping block opposite a base of the pawl, so the pawl is connected to the clamping block only at the base, thus defining a hinge means for the pawl.

In a further embodiment, the clamp assembly includes a clamp base having at least a pair of arms extending outward from the base, each arm having a plurality of ratchet teeth formed along at least one surface thereof and the arms being generally parallel, with the clamp base having a first support means for holding the elongate member during use of the clamp assembly. In this further embodiment, the assembly includes a clamping block having openings each sized and located to receive one of the ratchet arms. The clamping block has at least one pawl located in each opening, with the at least one pawl having at least one pawl tooth, and with the pawl located and configured to releasably engage the ratchet teeth when the ratchet arm extends into the opening a distance sufficient to engage the at least one pawl tooth.

In this further embodiment there is a clamping block having second support means for supporting the elongate member during use of the clamping assembly. Cap means cooperate with at least one of the first and second support means to support the elongated member during use of the clamp assembly. Advantageously, but optionally, the cap means further provides means for reducing acoustic noise. Optionally, there are also leg means on the base for releasably engaging a support during use of the clamping assembly. Further, there are advantageously, but optionally, hole means for fastening the base to a support during use of the clamping assembly. Preferably, the clamp base and clamping block are molded from the same material.

There is also advantageously provided a method for releasably securing a plumbing pipe. The method includes fastening a clamp base to the support, with the clamp base having at least one pair of ratchet arms extending outward from the base. Each arm advantageously, but optionally, has a plurality of ratchet teeth formed along at least one surface thereof and the arms being generally parallel. The base has a first support for the elongate member that includes at least two inclined surfaces forming a first, generally V-shaped notch that opens in the same direction the arms extend.

The method further includes fastening a clamping block to the ratchet arms. The clamping block has at least two openings each sized and located to receive one of the ratchet arms. The clamping block has at least one pawl located in each opening, and each pawl has at least one pawl tooth with the pawl located and configured to releasably engage the ratchet teeth as each ratchet arm extends into one of the openings a distance sufficient to engage the at least one pawl tooth. The clamping block has a second support for the pipe that includes at least two inclined surfaces forming a second, generally V-shaped notch that opens toward the clamp base and pipe.

The method further includes placing the pipe between the ratchet arms and first and second V-shaped notches either before or after the clamping block is fastened to the ratchet arms. Preferably, but optionally, at least one cap is interposed between the pipe and at least one one of the clamp base and clamping block by placing the cap over at least one of the first and second notches. The cap is sized and configured to engage a portion of the inclined surfaces forming the notch over which the cap is placed.

The method optionally includes forming the cap of a flexible material and forming a curved surface in the notch over which the cap is placed. Optionally, the interposing step further comprises placing two caps, one cap on each of the V-shaped notches, and advancing at least one of the clamp base and clamping block toward the other until the pipe is supported by at least one of the caps. Preferably, the cap is made of a material having a hardness of about 40-60 Shore A.

The method also optionally includes temporarily holding the clamp base or the clamping block to the support by placing the support between at least one resilient leg and a flange each extending from one of the base or clamping block in a direction opposite the ratchet arms, the flange and at least one leg being spaced apart a distance sufficient to allow the at least one leg to resiliently engage the support when the flange abuts the support and the support is interposed between the flange and the at least one leg.

The method also optionally includes fastening the clamp base to the support by placing a fastener through a first hole extending through the clamp base, the first hole being located between the inclined surfaces of the base. The method also optionally includes fastening the clamping block to the support by placing a fastener through a second hole extending through the clamping block, the second hole being located between the inclined surfaces of the clamping block. The method further optionally includes fastening the clamp base to the support by inserting a fastener through a third hole extending through the clamp base where the third hole is not located between the inclined surfaces. The method still further optionally includes fastening the clamp base to the support by placing a fastener through a hole in a flange that extends from the clamp base at right angles to the clamp base and toward the arms.

There is thus advantageously provided a clamping assembly that can be integrally molded from a single material, such as plastic, in order to reduce manufacturing costs, with resilient caps made of a different material to reduce noise. The assembly is easy to manufacture and use. The legs and flange allow the part from which they extend to be temporarily attached to a support while a fastener is placed to more securely hold the part to the support.

BRIEF DESCRIPTION OF THE DRAWINGS

These as well as other features of the present invention will become more apparent upon reference to the drawings in which like numbers refer to like parts throughout and wherein:

FIG. 1 is a perspective view of a bracket or clamp of this invention holding a pipe;

FIG. 2 is a top perspective view of a base as shown in FIG. 1;

FIG. 3 is a bottom perspective view of the base of FIG. 2;

FIG. 4 is a front plan view of the base of FIG. 2;

FIG. 5 is a bottom plan view of the base of FIG. 4;

FIG. 6 is a top plan view of the base of FIG. 4;

FIG. 7 is a left side plan view of the base of FIG. 4, with the right side view being a mirror image thereof;

FIG. 8 is a back plan view of the base of FIG. 4;

FIG. 9 is a bottom perspective view of a clamping block shown in FIG. 1;

FIG. 10 is a top perspective view of the clamping block of FIG. 9;

FIG. 11 is a front plan view of the clamping block of FIG. 9;

FIG. 12 is a bottom plan view of the clamping block of FIG. 11;

FIG. 13 is a top plan view of the clamping block of FIG. 11;

FIG. 14 is a left side plan view of the clamping block of FIG. 11, with the right side view being identical thereto;

FIG. 15 is a top perspective view of the base and block assembly as shown in FIG. 1, with the addition of caps 70;

FIG. 16 is a bottom perspective view of the base and block assembly as shown in FIG. 15, with the addition of caps 70;

as shown in FIG. 1;

FIG. 18 is a top perspective view of an alternative embodiment of a base for use with this invention;

FIG. 19 is a bottom perspective view of the base of FIG. 18;

FIG. 20 is a front plan view of the base of FIG. 18;

FIG. 21 is a bottom plan view of the base of FIG. 20;

FIG. 22 is a top plan view of the base of FIG. 20.

FIG. 23 is a left side plan view of the base of FIG. 20, with the right side view being a mirror image thereof;

FIG. 24 is a back plan view of the base of FIG. 20;

FIG. 26 is a perspective view of a further embodiment having a base plate without a depending flange;

FIG. 27 is a front view of the bracket of the bracket of FIG. 26;

FIG. 28 is a top view of the bracket of FIG. 27;

FIG. 29 is a bottom view of the bracket of FIG. 27;

FIG. 30 is a side view of the bracket of FIG. 27, with the opposing side view being a mirror image thereof;

FIG. 39 is a perspective view of a further embodiment of the bracket having a stiffener on the support arms;

FIG. 40 is a front view of the bracket of FIG. 39;

FIG. 41 is a top view of the bracket of FIG. 40;

FIG. 42 is a side view of the bracket of FIG. 40, with the opposing side view being a mirror image thereof;

FIG. 43 is a front perspective view of the base used in the bracket of FIG. 39;

FIG. 44 is a back perspective view of the base used in the bracket of FIG. 39;

FIG. 45 is a top view of the base of FIG. 43;

FIG. 46 is a front view of the base of FIG. 46;

FIG. 47 is a side view of the base of FIG. 46, with the opposing side view being a mirror image thereof;

FIG. 48 is a back view of the base of FIG. 46;

FIG. 49 is a top perspective view of the removable clamp of the bracket of 39;

FIG. 50 is a top perspective view of the removable clamp of FIG. 49 turned over;

FIG. 51 is a bottom plan view of the removable clamp of FIG. 49;

FIG. 52 is a front plan view of the removable clamp of FIG. 51;

FIG. 53 is a top plan view of the removable clamp of FIG. 52;

FIG. 54 is a plan side view of the removable clamp of FIG. 52 with the opposing side view being a mirror image thereof;

FIG. 57 is an upper perspective view of a further embodiment of a bracket having a plurality of resilient members on the support base;

FIG. 58 is a top plan view of the bracket of FIG. 57;

FIG. 59 is a front plan view of the bracket of FIG. 57;

FIG. 60 is a side plan view of the bracket of FIG. 59, with the opposing side view being a mirror image thereof;

FIG. 61 is an upper perspective view of the back of the base of the bracket shown in FIG. 57;

FIG. 62 is an upper perspective view of the front of the base shown in FIG. 61;

FIG. 63 is a perspective view of the bottom of the base shown in FIG. 61 viewed from below the base;

FIG. 64 is a top plan view of the base of FIG. 61;

FIG. 65 is a front plan view of the base of FIG. 61;

FIG. 66 is a plan side view of the base of FIG. 65, with the opposing side view being a mirror image thereof;

FIG. 67 is a back plan view of the base of FIG. 65;

FIG. 70 is a perspective view of a further embodiment of one portion of the mounting support of FIGS. 31, 55 and 68;

FIG. 71 is a partial perspective of a segment of the mounting support of FIG. 70, taken along section 71-71;

FIG. 72 is a front plan view of the support of FIG. 71; and

FIG. 73 is a side view of the support of FIG. 72, with the opposing side being the mirror image thereof.

DETAILED DESCRIPTION

Figure 17:
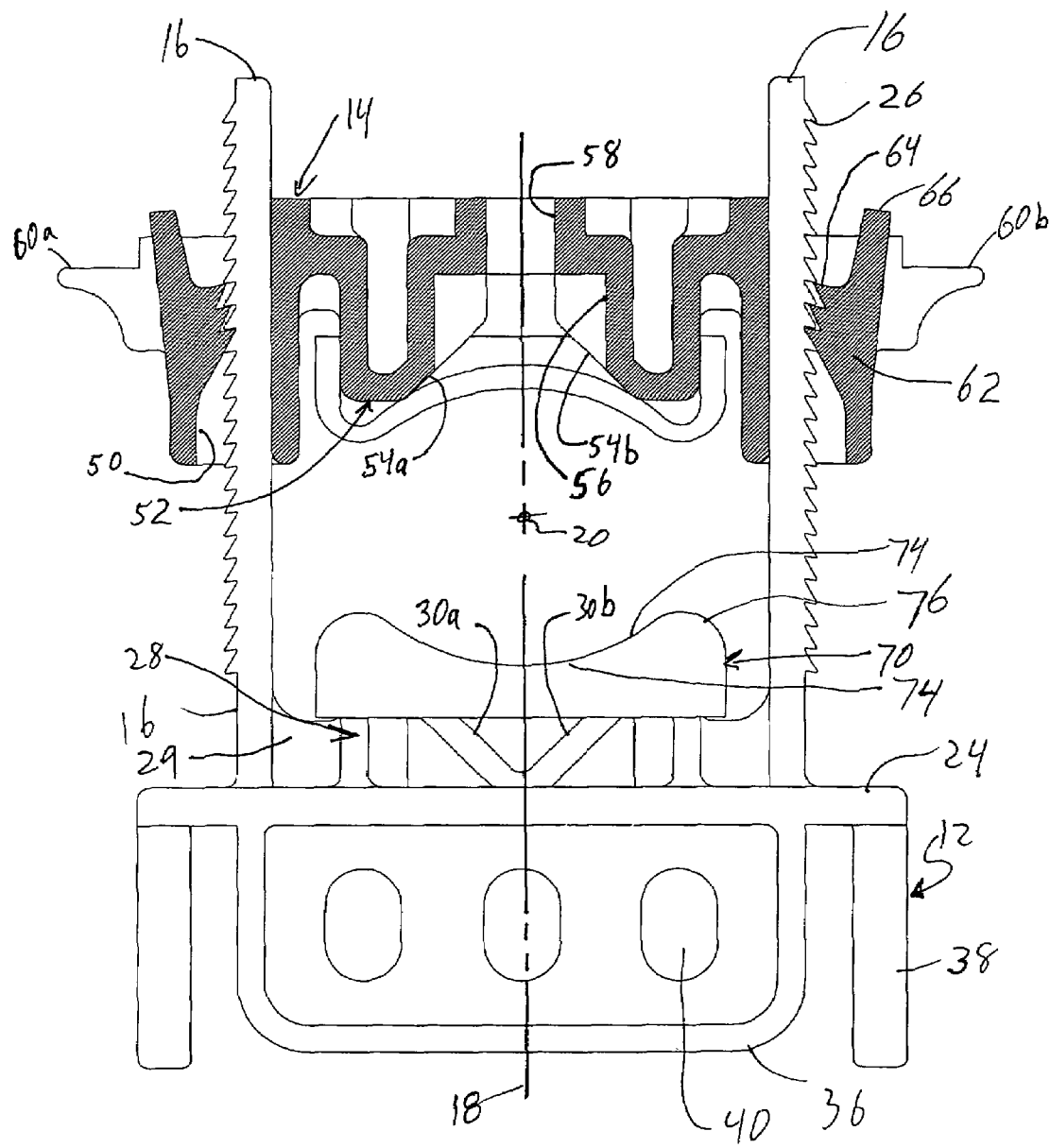
FIG. 17 is a partial sectional view of the base and block assembly taken along line 17-17 of FIG. 15.

Referring to FIGS. 1-8, 15-17 and 25, a two-part bracket 10 is provided that has a base 12 removably connected to a removable clamping block 14 by at least one and preferably a pair of arms 16. Advantageously, the arms 16 are parallel and extend along a separation axis 18 that is orthogonal to a longitudinal axis 20 of a pipe, cable, wire or other elongated member 22 to be held in the bracket 10 between the base 12 and clamping block 14. The longitudinal axis 20 may curve with the pipe or cable, but the orthogonal axis 18 is advantageously straight. For ease of illustration, the elongated member 22 will be described relative to a pipe.

The base 12 can take diverse forms. Advantageously the base 12 has a generally flat base plate 24 from which the arms 16 extend. The arms 16 preferably have ratchet teeth 26 on them. The teeth 26 are shown as extending outward from the arms 16. But the teeth could take the form of recesses in the arms, with the edges of the recesses forming the engaging surfaces comparable to teeth 26. As used herein, the reference to teeth 26 will refer to the engageable surfaces of the teeth whether those engageable surfaces extend outward from the arms 16 or are formed by recesses extending into the arms.

The teeth 26 are shown as extending along a substantial length of the arms 16. The teeth 26 are shown as being on the outside of the arms 16, facing away from axis 18 and facing away from the pipe 22 held in the bracket 10. The teeth 26 could be placed on the inside of the arms 16, the side facing the axis 18 and pipe 22. As used herein, the inner or inward direction refers to a relative orientation or direction toward axis 18. The outer or outward direction refers to a relative orientation or direction away from axis 18.

Located between the arms 16 is a base support portion that advantageously, but optionally, takes the form of two inclined base supports 28a, 28b. Each support 28a, 28b extends away from the base plate 24 toward the clamping block 14. Each support 28a, 28b can take various forms, including configurations conforming to the exterior shape of the member 22 at the location where the bracket 10 engages the elongated member. Preferably, the support 28 has a support for the elongated member 22. The support includes an inclined surface 30 that angles toward the base plate 24. The inclined surface 30 is preferably straight, but could be contoured to conform more closely to the mating surface of pipe 22. The inclined surfaces advantageously join adjacent base plate 24 so that the supports 28a, 28b form a generally V shaped support centered relative to axes 18 and 20. Alternatively, the inclined surfaces 30 could join base plate 24 with a slight gap or space between the between the supports 28, as described later regarding removable clamp block 14.

Figure 25:
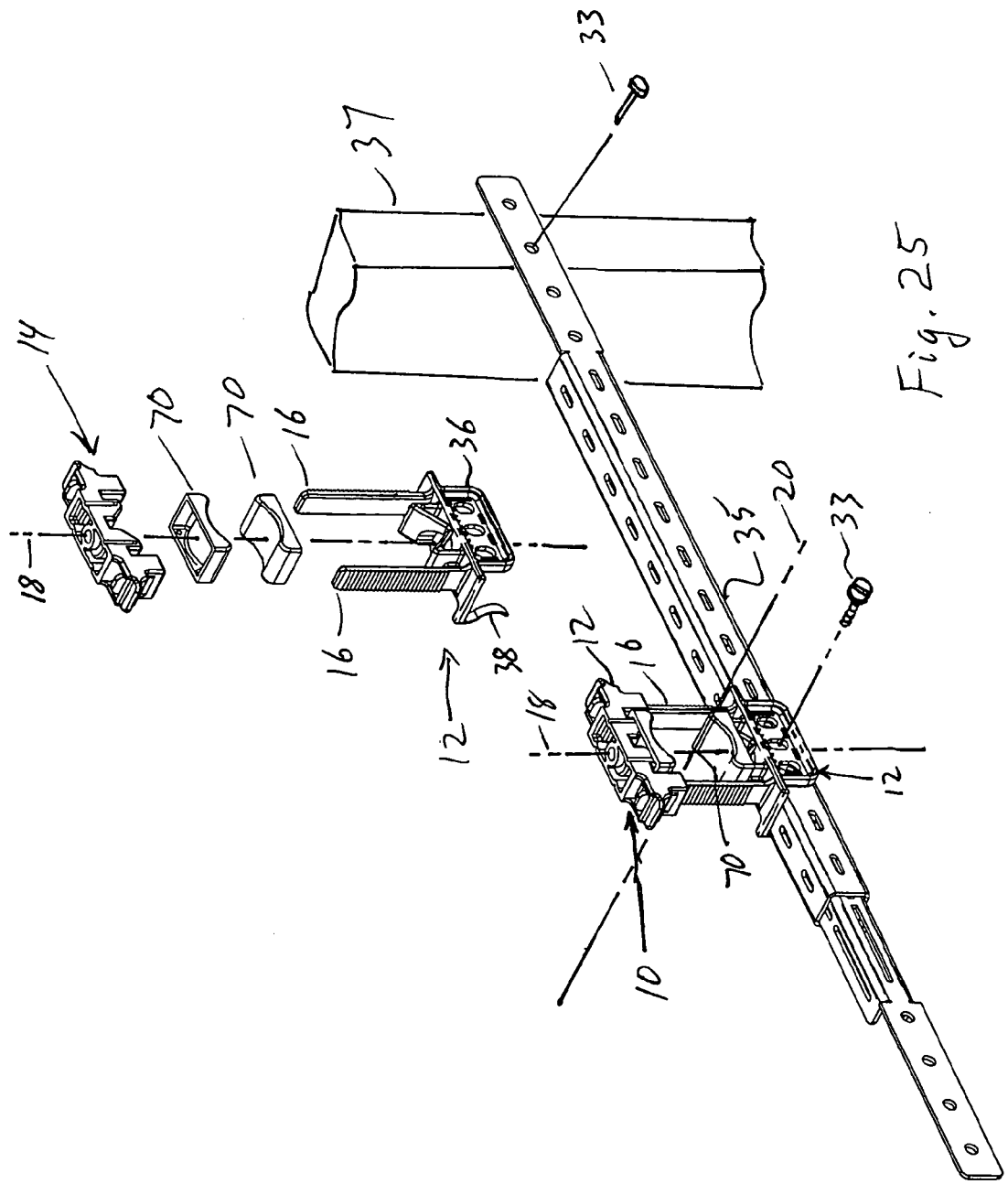
FIG. 25 is a perspective view of a bracket of this invention fastened onto a support structure.

Advantageously, but optionally, the supports 28a, 28b each form a single surface facing the pipe 22 (FIG. 1), but the supports 28a, 28b could be formed by parallel, spaced apart plates that extend from base plate 24 toward the pipe 22 and having distal edges shaped to receive the pipe. Advantageously, but optionally, the base support 28 is fastened to the arms 16 at or adjacent to the base plate 12 as seen in FIGS. 2, 5-8 and 25. A short wall 29 (FIG. 5) is shown connecting the parts. This joinder provides for a stiffer and stronger bracket and helps prevent the arms 16 from breaking adjacent base plate 24, and helps the supports 28a, 28b from breaking. The form of wall 29 can vary. The wall 29 could be omitted, especially if the supports 28 are fastened to or extend from the base of the arms 16. The supports 28, with or without the inclined surfaces 30, and including the various forms the supports 28 can take, advantageously provide a first support means for holding the elongate member 22 during use of the clamp assembly;

Advantageously, but optionally, the base support 28 has a recess 32 (FIG. 2) formed therein, with the recess opening onto a hole 34 (FIG. 3) extending through the base plate 24. The recess 32 is advantageously large enough to accommodate the head of a fastener 33 (FIG. 25), such as a snap fastener, or a threaded fastener such as a bolt or screw, or any other fastening device. The recess 32 is preferably but optionally cylindrical. The hole 34 is advantageously large enough to accommodate the engaging portion of the fastener but small enough to prevent passage of the head of the fastener. The hole 34 is shaped to accommodate the particular fastener used to fasten the base 12 to a structural support 35 (FIG. 25). Such structural supports 35 are commonly fastened between studs 37 of buildings, and may comprise adjustable length, telescoping members. One such telescoping support member is described in U.S. patent application Ser. No. 09/898,538, filed Jul. 3, 2001, and titled Stub-Out Bar, the complete contents of which are hereby incorporated by reference. The supports 35 have one or more holes that align with holes in the bracket 10 to allow the brackets 10 to be fastened to the supports 35, as described herein.

Advantageously, but optionally, the hole 34 is a slot or slightly oblong or oval in order to allow some movement of the base 12 along the longitudinal axis 20 when the fastener 33 engages a structural support 35. Optionally, the recess 32 is also large enough to accommodate a washer. The recess 32 causes the single surface of base support 28 to have a larger width measured along longitudinal axis 20 (FIG. 1) on the upper portion of the support surfaces 28a, 28b, and to have a narrower width adjacent the base plate 24.

As seen in FIGS. 2-8, the base plate is advantageously generally flat and has a lower, flat surface facing toward the structural support 35 to which the base 12 is mounted during use. Depending from the base plate 24 is a mounting flange 36 and at least one, and preferably two or more resilient members or legs 38. The mounting flange extends from a long edge of the generally rectangular base plate 24 generally parallel to axis 18 and opposite the arms 16. The mounting flange 36 has one or more holes 40 through which fasteners 33 extend during use of the bracket 10 to fasten the base 12 to a structural support 35. Three holes 40 are shown, but there could be fewer or more, and the shape of the mounting flange 36 could vary. The holes 40 are oriented so the fastener 33 extending through the holes is generally parallel to the longitudinal axis 20.

The resilient legs 38 are sized and located to resiliently engage the structural support 35 to which the bracket 10 is mounted. The legs 38 depend from the support base 24, preferably from an edge of the support base 24 that is opposite the mounting flange 36. The legs 38 are preferably, but optionally, parallel to but spaced apart from the mounting flange 36 a distance to allow the legs and flange to be placed on opposing sides of a structural support 35 during use of the bracket.

As seen in FIG. 7, the leg 38 has one end fastened to base 12 and a distal end 42 that is free. The leg 38 is formed or fastened so that it is resiliently urged toward the mounting flange 38. The distal end is advantageously, but optionally, curved away from the mounting flange 36 so that the distal end can be engaged with an edge of a structural support 35 and resiliently bent away from the base 12 to fit over the structural support 35 and resiliently hold the structural support 35 between the leg or legs 38 and the mounting flange 36. The depicted leg 38 curves toward the mounting flange 36 a distance that is smaller than a width of a structural support 35 to which the base 12 is to be fastened during use, with the distal end then recurving, in an opposing direction and away from flange. 36. The leg 38 is thus doubly curved. As illustrated, the distal end 42 ends vertically below and slightly inward of the edge of base plate 12 to which the leg is fastened. The distal end of the leg 38 extends away from the flange 36 to make it easier to slip onto the support 35 (FIG. 25). The leg or legs 38, in all its variations, comprises resilient leg means on the base 12 for releasably engaging the support 35 during use of the clamping assembly 10.

Referring to FIGS. 1, 2-12 and 15-17, the removable clamping block 14 is shown. The clamping block is generally rectangular in shape, although the shape can vary. The clamping block has two slots, holes or openings 50*a*, 50*b* preferably, but optionally, extending entirely through the clamping block 14 and sized and located to receive the arms 16. The arms 16 are advantageously approximately rectangular in cross-section, so the openings 50*a*, 50*b* are also rectangular in cross-section, but the shapes of the arms and openings can vary.

Between the openings 50 is a clamp block support surface 52. Advantageously, but optionally, the clamp block support forms a generally V shape, and advantageously comprises two inclined surfaces 54*a*, 54*b* that are inclined toward each other to form a generally M-shaped support when viewed along longitudinal axis 20 (FIG. 11). The inclined surfaces 54 extend toward and can join the clamping block support 52 with the notch of the V shaped incline being formed at the juncture. Preferably, though, the inclined surfaces 54*a*, 54*b* end before being joined and are separated by a slight gap or space (FIG. 11).

Advantageously, but optionally, the supports 28*a*, 28*b* each form a single surface facing the pipe 22 (FIG. 1), but the supports 28*a*, 28*b* could be formed by parallel, spaced apart plates that extend from base plate 24 toward the pipe 22 and having distal edges shaped to receive the pipe. Advantageously, but optionally, the base support 28 is fastened to the arms 16 at or adjacent to the base plate 12 as seen in FIGS. 2, and 5-8. A short wall 29 (FIG. 5) is shown connecting the parts. This joinder provides for a stiffer and stronger bracket and helps prevent the arms 16 from breaking adjacent base plate 24, and helps the supports 28*a*, 28*b* from breaking. The form of wall 29 can vary. The wall 29 could be omitted, especially if the supports 28 are fastened to or extend from the base of the arms 16. The clamping block support 52 and the walls 54*a*, 54*b*, and the various forms the support 52 can take, comprise second support means for supporting the elongate member 22 during use of the clamping assembly.

Advantageously, but optionally, the clamp block support 52 has a recess 56 (FIGS. 9 & 11) formed therein, with the recess opening onto a hole 58 (FIGS. 10, 12-13) extending through the clamping block 14. The recess 56 is advantageously large enough to accommodate the head of a threaded fastener 33, such as a bolt or screw, or any other fastening device. The recess 56 is preferably but optionally cylindrical. The hole 58 is advantageously large enough to accommodate the engaging portion of the fastener 33 but small enough to prevent passage of the head of the fastener 33. The hole 58 is shaped to accommodate the particular fastener 33 used to fasten the clamping block 14 to a structural support 35, as desired. Advantageously, but optionally, the hole 58 is a slot or slightly oblong or oval in order to allow some movement of the clamping block 16 along the longitudinal axis 20 when the fastener 33 engages a structural support 35.

Optionally, the recess 56 is also large enough to accommodate a washer. The recess 56 can cause the single surface of each support surface 54*a*, 54*b* to have a larger width measured along longitudinal axis 20 as described relative to recess 32 (FIG. 1) on the upper portion of the support surfaces 54*a*, 54*b*, and to have a narrower width adjacent the juncture of the support surfaces with the clamping block 16. But preferably, the recess 56 is centrally located at the juncture of the inclined surfaces 54 so that the recess forms a semi-circular indentation into the end of the surfaces 54*a*, 54*b* (FIG. 12).

The clamping block has distal ends 60*a*, 60*b* (FIG. 11) that preferably, but optionally have a lip or flange that can be manually engaged with a person's fingers. Moreover, a pawl 62 (FIG. 17) having one or more pawl teeth 64 is placed inside the openings 50 and located to engage the teeth 26 on arms 16 that extend through the openings 50. Referring to FIGS. 11-14 and 17, the pawl 62 has one end fastened to clamp block 14 and a distal end 66, with teeth 64 located there between and orientated to engage the teeth 26. The distal end 66 advantageously extends outside the openings 50 a distance sufficient for a person to manually actuate the pawl 62 and disengage or engage the teeth 64 with the teeth 26.

There are various ways of mounting the pawl to engage the teeth on arms 16. Advantageously, but optionally, the pawl 66 forms one side of each opening 50 through which the arms 16 extend. The pawl has a length between its attachment to the clamping block 14 and distal end 66. The pawl 62 has a width defined by two slots 68*a*, 68*b* (FIG. 14) formed in one wall defining the opening 50, preferably but optionally formed in the outer wall located away from and generally parallel to axis 18. The slots are preferably parallel to each other. The teeth 64 of pawl extend inward, toward axis 18. The pawl 62 thus forms a resilient member having a stiffness defined by the width, length and thickness of the pawl, and the material of which the pawl is made. The ends of the slots 68 cause the base of the pawl 62 to be flexible or rotatable so the distal end 66 can move or rotate toward and away from axes 18 and 20, but the pawl is stiff and generally inflexible in translation along axes 18, 20.

Advantageously, but optionally, a cap 70 is placed over the supports 52, and also over supports 28. The cap 70 is preferably formed of a flexible material that has vibration damping characteristics, and more preferably has acoustic dampening characteristics. The cap 70 thus advantageously, but optionally, comprises means for reducing acoustic noise transfer from the pipe 22 to the clamp 10. The cap 70 is configured to conform to the general shape of the supports 28, 52. As seen in FIGS. 15-17 and 25, the cap has a generally rectangular shape with a flat bottom 72 and a top 74 that curves toward the bottom, with rounded ends 76. The cap 70 is sized so that the ends of the support 28, 52 engage the ends 76 and restrain movement of the ends 76 toward axes 18, 20. The cap is basically stretched on or held on the supports 28, 52. Additionally, but optionally, the cap 70 may be secured to the supports 28, 52 by means including adhesive or cooperating mechanical features on the respective parts, as descrbed below. The center of the top advantageously does not abut the inclined surfaces 30, 54, but is stretched between and away from them.

The cap 70 helps better grip the elongated member such a pipe 22. But more advantageously the cap 70 helps dampen noise from the elongated member, as discussed later. The cap 70 is preferably removable, and is optional. Means may be provided to secure the cap to the clamp base or clamping block. These means may include adhesive or, preferably, interlocking mechanical features on the respective parts, snap-lock engaging parts and recesses, threaded fasteners, pins, or other means known to those skilled in the art for fastening the cap to the base either permanently, or preferably removably.

A cap 70 made of an elastomeric material is believed suitable, with thermoplastic rubber (TPR) believed suitable. A cap 70 having a thickness of about 1/16 inch (about 1.6 mm), of 50 Shore A hardness, is believed suitable when the cap 70 has an exterior width of about ⅝ inch (about 16 mm) and a length of about 1 inch (about 25 mm). A material hardness of about 40-60 Shore A is believed suitable. A softer material, Shore 40 and below, dampens better, but is difficult to mold using present technology, and it also tends to break down under high pressure clamping forces. Thus, if technology improves, a softer material could also be suitable, and could be preferable. Each of the caps 70 advantageously comprise cap means cooperating with at least one of the first and second support means (generally 28, 52) to support the elongated member 22 during use of the clamp assembly 10.

As seen in FIGS. 1 and 15-17, the arms 16 on the base 12 and the openings 50 on the clamping block 14 align the supports 28, 52 so the inclined surfaces 30, 54 can clamp elongated member 22 between the inclined surfaces. Preferably the generally V-shaped notches formed by inclined surfaces 30, 54 are symmetrically located about the plane containing axes 18, 20.

In use, the base 12 is preferably fastened to a structural support 35. The flange 36 and resilient member(s) 38 cooperate to resiliently and removably grip the structural support 35 between the flange and legs. A fastener 33 is then placed through one or more of holes 34, 40, to more securely fasten the base 12 to the structural support 35. The legs 38 help temporarily hold the base 12 in position, allowing easier installation and the need for fewer hands to simultaneously hold the parts in position during installation.

Once the base 12 is fastened to a structural support 35, then the elongated member 22, such as a pipe, is placed between arms 16 and abutted against the support 28, with the inclined walls 30a, 30b, centering the pipe relative to the base. The holes 34 and 40 are preferably, but optionally elongated so the base 12 can be moved relative to the structural support 35 and pipe 22 to align the base and pipe 22. Advantageously the cap 70 is placed on the support 28 before the pipe 22 is engaged with the base 12. The clamping block 14 is then engaged with arms 16 and urged toward the base 12 until the support 52 and inclined walls 54a, 54b engage the walls of the elongated member such as pipe 22. Advantageously the cap 70 is placed on the support 52 and over walls 54a, 54b before the clamping block 14 is urged against the pipe 22. The clamping block 14 and base 12 cooperate to hold the pipe 22 in position. The distal ends 60a, 60b can be used to manually position the clamping block 14. The distal end 66 of each pawl 62 can be used to manually engage, or release the engagement of teeth 64, 26. Fasteners 33 can be placed along two axes of base 12 by placing fasteners 33 through holes 40 and 34, in order to restrain translation along two axes and rotation about two axes, with the shape of the base 12 restraining motion along the third translational axis and restraining rotation about the third axis.

Alternatively, the clamping block 52 could be fastened to the structural support 35 by placing a fastener 33 through hole 58, and then the pipe 22 could be urged against the support 52 with the inclined walls 54a, 54b centering the pipe relative to the clamping block 52. The base 12 can then be installed, with the arms 16 extending through openings 50 so the teeth 64 on pawl 62 can engage the teeth 26 on arms 16. Again, the caps 70 are advantageously interposed between the supports 28, 52 and the pipe 22 before clamping the pipe tightly between the base 12 and clamping block 14. The use of a hole 34, 40 or 58 in each of the base 12 and clamping block 14 allows either of the parts 12, 14 of the bracket 10 to be fastened to a support 35. Additionally, the upper surface of clamping block 14 will optionally allow clamp 10 to be fastened to a flat surface such as a stud 37 or a wall. The bracket 10 can thus be fastened in various orientations. The various holes 34, 58, 40 advantageously comprise hole means for fastening the base 12 to the support 35 (FIG. 25) during use of the clamping assembly 10.

The base 12 and clamping block 14 are advantageously integrally molded of plastic, which reduces costs. A nylon plastic is believed suitable. Advantageously, but optionally, and depending on the shape of pawl 62, the clamping block 14 is molded to have a slight curve about axis 20 (FIG. 17), sufficient so the surface of block 14 most distant from axis 20 is not planar, but is curved to form an offset of about 2-3 degrees between the opposing ends 60a, 60b. The slight curvature helps the teeth 64 on pawl 62 engage the teeth 26 on arms 16. If the curvature is too great, then as the clamping block 14 approaches the base 12, the base of the arms 16 binds against the clamping block and the arms 16 may break, be cracked or be damaged.

The legs 38 cooperate with flange 36 to temporarily hold the base 12 in position. The legs are advantageously symmetrically located relative to flange 36 to avoid any twisting motion. Thus, there are advantageously, but optionally, two legs 38 on opposing ends of flange 36, or a single leg 38 at the middle of flange 36.

The supports 28, 52 are advantageously stiff enough to hold the pipe. There are advantages if the inclined surfaces 30, 54 conform to the shape of the elongated member 22. By having the inclined surfaces 54 spaced apart from each other, the clamping block 14 is more flexible about axis 20 (FIG. 17) and can better grip the elongated member 22. By having the recess 56 located on axis 18 and located between substantial portions of inclined surfaces 54a, 54b, the flexibility of clamping block 14 to bend about axis 20 is also increased and the ability of the clamp 10 to better grip the elongated member 22 is increased.

If the elongated member 22 is a pipe, then fluid flow through the pipe can create noise. In order to make the base 12 and clamping block 14 strong enough and durable enough for residential and commercial plumbing use, the material must be hard and that hard material transmits the pipe vibration to the structural support 35 to which the bracket 10 is fastened. The caps 70 help reduce vibration and reduce noise transmission from the pipe 22 through the bracket 10 and into the structural support 35, providing a quieter installation and support of the pipes. Further, separating the inclined surfaces 30a, 30b and separating the inclined surfaces 54a, 54b so they are not joined is also believed to reduce the transmission of vibration and noise through the bracket 10. The combination of the dampening cap 70 and the separately inclined surfaces 30a, 30b, and 54a, 54b, is believed to further enhance the reduction of noise transmission.

A further embodiment of base 12 is shown in FIGS. 18-24. This embodiment lacks the flange 36 and legs 38 shown in FIG. 1. Instead it modifies the base plate 24 so there is at least one angled connector 80 having two surfaces at right angles, each with a hole 82 through which a fastener 33 can extend to fasten the connector and base 12 to a support 35 (FIG. 25). The figures show two angled connectors 80, one at each end of the base plate 24. Each of the connectors 80 has a mounting tab 84 extending generally perpendicular to the base plate 24. The mounting tab 84 is akin to the flange 36, but extends in the opposite direction as the flange 36. A hole 82 is formed in the mounting tab 84, and adjacent thereto another hole is formed in the base plate 24. That arrangement allows the base plate to be fastened to a single support 35 in either of two orientations, and it also allows the base 12 to be fastened in a notch in a support where the notch has a recess with perpendicular or generally perpendicular walls. A gusset 96 may extend between the mounting tab 84 and the base plate 24 for additional strength, as needed. The other parts are as described above, and for brevity that description is not repeated.

In a still further embodiment or variation, the resilient legs 38 and flange 36 could be placed on either the base 12 or the clamping block 14. Thus, a clamp assembly 10 is advantageously provided for holding pipe or elongated member 22 having longitudinal axis 20 to a support 35, with the assembly being oriented along the axis 18 orthogonal to the longitudinal axis 20. The assembly includes a clamp base 12 and a clamping block 14. The two parallel arms 16 extend outward from one of the clamp base 12 and the clamping block 14 and are located on opposing sides of the orthogonal axis 18 during use of the clamp assembly 10. There are two holes or openings 50 in the other of the clamp base 12 and the clamping block 14 with each hole 50 being sized and located to receive one of the arms 16 and with the two holes 50 being located on opposing sides of the orthogonal axis 18 during use of the clamp assembly 10.

In this further embodiment, there is a clamp base pipe support 28 extending outward from the clamp base 12, with the clamp base pipe support having two opposing ends located on opposing sides of the orthogonal axis 18 during use of the clamp assembly and located between that orthogonal axis 18 and the arms 16 and holes 50 during use of the clamp assembly. The clamp base pipe support 28 has a middle, at the notch of the generally V-shape notch formed by inclined surfaces 30a, 30b and adjacent base 12, with the ends of the clamp base pipe support extending further outward than that middle, as seen in FIGS. 4 and 8. There is also a clamping block pipe support 52 extending outward from the clamping block 14 toward the clamp base 12 during use of the clamp assembly 10. The clamping block pipe support 52 has two opposing ends located on opposing sides of the orthogonal axis 18 during use of the clamp assembly 10 and located between that orthogonal axis 18 and the arms 16 and holes 50 during use of the clamp assembly 10. The clamping block pipe support 52 has a middle adjacent the juncture of the inclined surfaces 54a, 54b with the ends of the clamping block pipe support 52 extending further outward than that middle, as seen in FIG. 11.

In this further embodiment a latch mechanism can be located in each hole 50 to releasably engage the arm 16 received in that hole. Advantageously the latch mechanism comprises the pawl 62 engaging the teeth 26 on arms 16, although other releasable latching mechanisms can be used.

Moreover, in this further embodiment, member 38 extends outward from the one of the clamp base 12 and the clamping block 14 from which the flange 36 extends and extends generally parallel to the flange. The flange 36 and member 38 are located on a side of the one of the clamp base 12 and clamping block 14 that is opposite to the pipe support 28, 52 of the one of the clamp base 12 and clamping block 14 from which the flange 36 and member 38 extend. The member 38 is resiliently disposed toward the flange 36 and is spaced apart from the flange 36 by a distance less than a width of the support 35 (FIG. 25) at a location where the clamp assembly 10 is to be mounted during use of the clamp assembly in order to resiliently hold one of the clamping base 12 and clamping block 14 to the support 35 during use of the clamping assembly 10.

Referring to FIGS. 26-38, in a still further embodiment the base plate 24 has no flange 36. But a stiffening gusset 90 extends between the base plate 24 and at least one and preferably both of the adjacent arms 16. Advantageously the gusset 90 is along one edge of the base plate 24. Preferably, as best seen in FIG. 27, the gusset 90 also extends between arms 16 so as to extend substantially the entire length of the base plate 24. The gusset 90 can extend along the edge of the base plate 24 as shown in FIGS. 28 and 30, or at least a portion of the gusset 90 can be located inward of the edges, as shown in FIGS. 33 to 38 where the gusset 90 extends between the arms 16 and the base supports 28 inward of the periphery of the base plate 24. If the gusset 90 extends between the arms 16, then the base supports 28 are also preferably but optionally fastened to the gusset 90. The gusset 90 stiffens the base plate 24 and bracket 10.

Further, the base plate 24 advantageously has one or more holes 92 extending through the base plate. The illustrated embodiment has holes 92 at the middle and adjacent the opposing ends of the base plate. The holes 92 are advantageously sized to allow fasteners 33 (such as threaded fasteners) to extend through the base plate 24 to fasten the bracket 10 to a structural support 35 or other flat surface. The holes 92 can be circular, oval, or of other shapes. The holes 90 allow the bracket 10 to be fastened to the structural support 35 while the pipe 22 (FIG. 1) is in place. If the pipe is already in place, access to the central hole 90 between the base supports 28 is restricted or non-existent. But the outer holes 92 can be used. To do so, the distal holes 92 are preferably located outside the arms 16 so access to the holes 92 and fasteners 33 inserted through the holes can be more easily achieved and so the access is not blocked by the pipe 22 (FIG. 1) extending between the arms 16.

The embodiment of FIGS. 26-30 shows the resilient cap 70 on the base support 28. Referring to FIGS. 33-38, the inclined surfaces 30 are advantageously joined by a curved portion 93 between the ends of the surfaces 30 closer to the base plate 24. The curved portion 93 is in the embodiment of FIGS. 28-30, but difficult to see because of the cap 70. Advantageously the inclined surfaces 30 are straight and joined by the curved portion 93, preferably (but optionally) with the straight portions joining the curved portion in a tangential manner.

Figure 31:
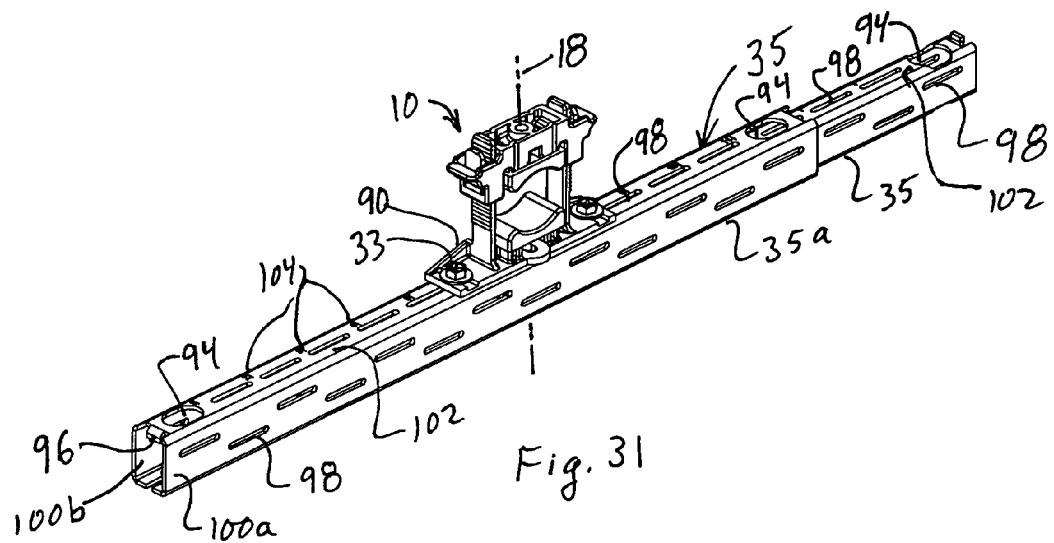
FIG. 31 is a perspective view of the bracket of FIG. 26 secured to a first mounting support.

Referring to FIG. 31, a variation in the support structure 35 is shown suitable for use as a trapeze mount. The support structure 35 has nested sections 35a, 35b that slide relative to each other to adjust the length of the support structure 35. The depicted support structure has two telescoping, open-box box sections 35a, 35b, with the outer box section 35a being outside and containing the nested inner box section 35b. Closed box sections could also be used. FIG. 31 shows a generally square cross-section on the support structure 35.

Adjacent each of the opposing ends of that support structure 35 is an opening 94. An opening 94 about 0.375 inches wide, preferably elongated in shape is believed suitable. During use a threaded drop rod can be fastened to a building, with the rod extending through an opening 94. Each end of the support bar 35 can be suspended this way to form a trapeze mount. Other mechanisms for fastening the rod to the support member 35 can be used, such as nuts, pins, adhesives, welding, etc. The elongated opening accommodates some misalignment between the rod and support member 35. Preferably the opening 94 extends entirely through the support member 35 so the drop rod could also extend entirely through the support bar rather than hitting the opposing side of the support bar 35. A flexible member could be used rather than a threaded metal rod as is typically used for the drop rod. The size of the opening 94 is selected to match the rod or other support to which the support member 35 is fastened.

At each distal end of the support structure 35 is a stop member 96 extending in a direction which engages the other of the telescoping portions that make up the support bar. In FIG. 31, the stop member 96 on the left end is on the outer portion 35a and extends inward of the support portion 35a so as to engage the nested support portion 35b and prevent it from sliding past the stop member 36. The stop member 96 on the right end is on the inner portion 35b and extends outward of the support member 35b so as to engage the outer support portion 35a and prevent portion 35a from passing the stop member 96. The stop members 96 are preferably formed by bending an end portion of the member 35 inward or outward. But the stop members 96 could be fastened to the support member, by welding, adhesives, or could comprise screws extending through the walls of the support member 35 adjacent one or more ends of the member 35, and preferably immediately adjacent the ends. In the depicted embodiment the wall of the support member 35 from which the stop member 96 is formed is separated from the adjacent walls and bent inward or outward.

Still referring to FIG. 31 a plurality of elongated slots 98 are placed in a staggered relationship on opposing sides 100a, 100b of the support member 35. A series of aligned slots are placed on the top wall 102 of the support structure 35, which joins the opposing sides 100a, 10b, preferably down the middle of the top wall 102. The slots 98 are preferably, but optionally placed on both the inner and outer portions of the support member 35a, 35b and aligned. The slots 98 are aligned and sized appropriately so threaded fasteners can extend through the slots. Slots 98 about 0.75 inches long, about 0.10 inches wide and about 0.95 inches apart are believed suitable to accommodate number 8 sheet metal screws. A metal support member 35 about 1/16 inch thick and about 0.9 inches square on the larger or outer support portion 35a is believed suitable. A rectangular cross section on the support members is also suitable, with a 0.9 inch by 0.6 inch rectangular section on the outer support portion 35a being suitable. The bracket 10 can be fastened to the top of the support bar by putting fasteners 33 through the holes 90 in the base plate 24, and extending through slots 98 on the support member 35.

Still referring to FIG. 31, the top wall 102 advantageously has printed indicia 104 at inch and fractional inch intervals. The printed indicia 104 advantageously comprises sequential numbers so that the indicia 104 acts as a measuring device to allow a user to preset the length of the support member 35, or to position the bracket 10 at a predetermined position along the length of the support member 35.

Figure 32:
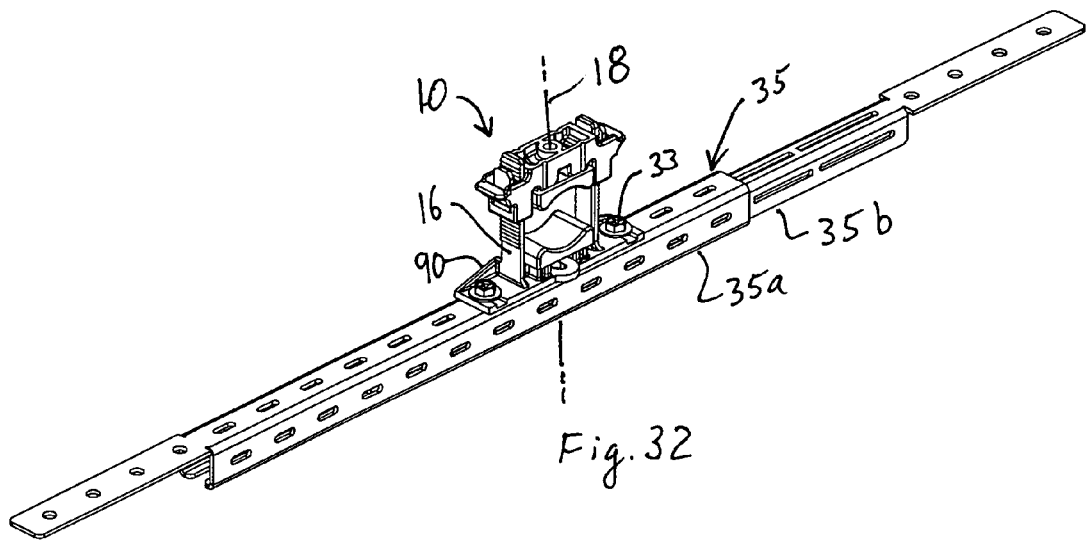
FIG. 32 is a perspective view of the bracket of FIG. 26 secured to a second mounting support.
Figure 33:
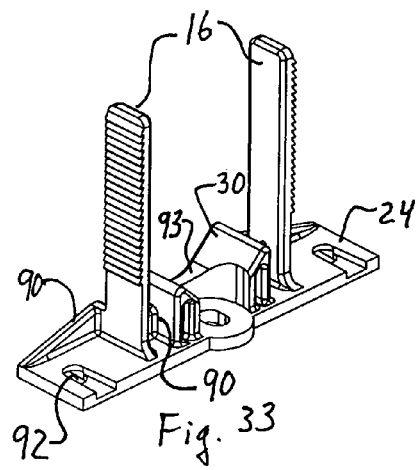
FIG. 33 is a front perspective view of the base of the bracket shown in FIG. 26.
Figure 34:
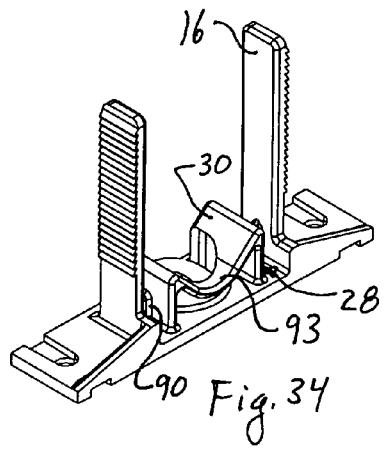
FIG. 34 is a back perspective view of the base of the bracket shown in FIG. 26.
Figure 35:
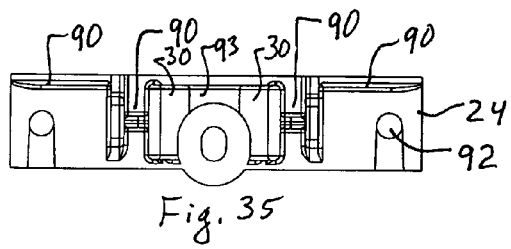
FIG. 35 is a top view of the base of FIG. 33
Figure 36:
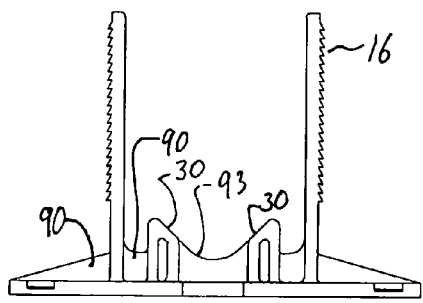
FIG. 36 is a front view of the base of FIG. 33.
Figure 37:
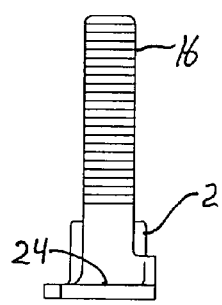
FIG. 37 is a side view of the base of FIG. 36, with the opposing side view being a mirror image thereof.
Figure 38:
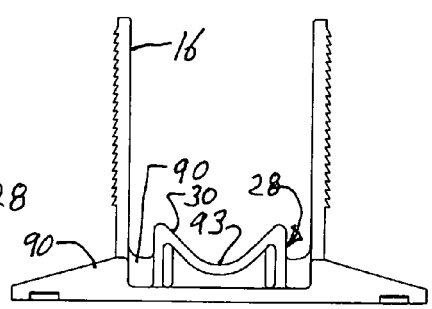
FIG. 38 is a back view of the base of FIG. 33.

Referring to FIG. 32, the bracket 10 with gussets 90 is fastened to the support bar 35 of the type previously described relative to FIG. 25 with end tabs that may be bent to accommodate different ways of fastening to a structural support. That description is incorporated here by reference. In the embodiments of FIGS. 31 and 32, the bracket 10 abuts only one surface of the support member 35 whereas in the prior embodiments the bracket to abutted two sides of the support member 35. But the embodiment of bracket 10 shown in FIGS. 31 and 32 can mount on a flat surface whereas the prior embodiments mounted on a corner or other configuration having two intersecting surfaces.

Referring to FIGS. 49 to 56, a still further embodiment is shown. This embodiment is like the embodiment of FIG. 1 except it lacks the flange 36 and resilient legs 38, and instead has a flat bottomed base plate 24 as in the embodiment of FIG. 26 to rest on a flat surface. Further, this still further embodiment has a stiffening rib 110 on the ratchet arms 16 which divide the ratchet teeth 26 into two groups of adjacent teeth separated by the rib 100, and engaged by two adjacent pawls 66a, 66b.

There are thus parallel arms 16 having a rib 110 running preferably from the base plate 24 along the entire length of each arm 16. The rib 110 could be shorter and extend a substantial length of each arm 16, such as over half that arm length. The rib 110 is to stiffen the arms 16 and allow heavier loads to be carried by the arms 16 and bracket 10.

The rib 110 is preferably, but optionally placed toward the middle of the arm 16. The rib 110 could be placed at one or both sides of arm 16 but that is less desirable because it requires a greater reconfiguration of the removable clamping block 14. The rib 110 could be on the side of the arm 16 facing the pipe 22 (FIG. 1) and facing the other arm 16, but that is less desirable because it can crate alignment difficulties with the openings 50 in the removable clamping block 14. The rib 110 is thus preferably on the side of arms 16 facing away from the pipe 22 (FIG. 1) and facing away from the other arm 16.

A larger rib 110 is stiffer and stronger, but the larger the width of the rib 110 along pipe axis 20, the less area for teeth 26 on pawls 62 (62a, 62b in FIG. 42) to engage—for a fixed width of the arm 16 along the longitudinal axis 20. A wider rib 110 thus reduces the area of engaging teeth 26, 64 and that reduces the weight the removable clamping block 14 can carry when the bracket 10 is used in an orientation where the weight of the pipe is carried by the removable clamping block 14.

If the rib 110 is made too high along the axis orthogonal to the plane containing the axes 18, 20 which extends from the arm 16 toward the mating pawls 62, then that makes the arms less flexible and also complicates the construction and fabrication of the removable clamping block 14. The size of the rib 110 relative to the arm 16 and teeth 26 will thus vary according to the particular circumstances. A suitable compromise uses arms 16 made of a flexible polymer such as nylon about ¾ inch wide, with a rib 110 about 0.075 inches thick along the axis 20 of the pipe, and with the rib extending about 0.1 inch beyond the teeth 26. A rib 110 having a height about 2-3 times the thickness of the arm 16 is believed suitable, and is preferably about twice the thickness of the arm 16. These dimensions and ratios are not limiting and are given for illustration.

As the ratchet teeth 26 on arms 16 are split into two rows by the rib 110, two pawls 62 are needed for each arm 16. The rows of teeth 26 on each side of the rib 110 are preferably aligned so the teeth 64 (64a, 64b) on the pawls 62 (62a, 62b) simultaneously engage the ratchet teeth 26 on the arms 16.

As in the prior embodiment of FIG. 1, the distal ends 66 (66a, 66b) of the pawls 62 are preferably engagable by hand to allow manual release and adjustment of the removable clamping block 14. Referring to FIGS. 45-47 and 48, the base support 28 is advantageously, but optionally, connected to the adjacent arms 16 by gusset 90. The gusset 90 is preferably low enough so it does not hinder cap 70 from being placed on the support 28.

Referring to FIGS. 49-52, the clamping block support 52 is slightly altered in this embodiment as it has enclosed sides forming the support. The closed sides can help strengthen the support 52 and can reduce the nooks and crannies which can collect debris.

Figure 55:
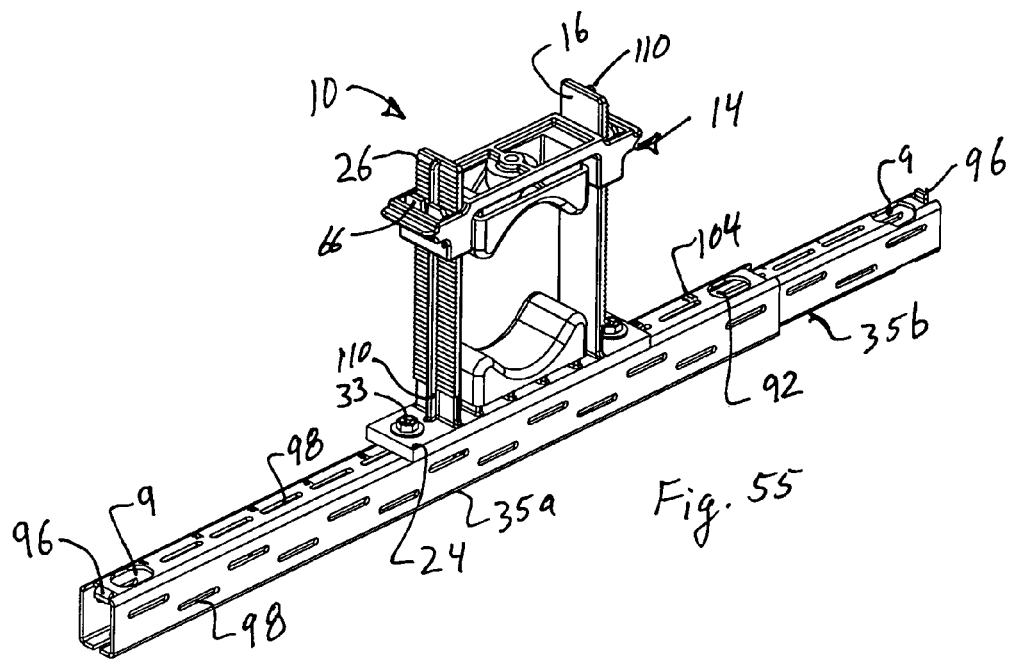
FIG. 55 is an upper perspective view of the bracket of FIG. 39 secured to a first mounting support.
Figure 56:
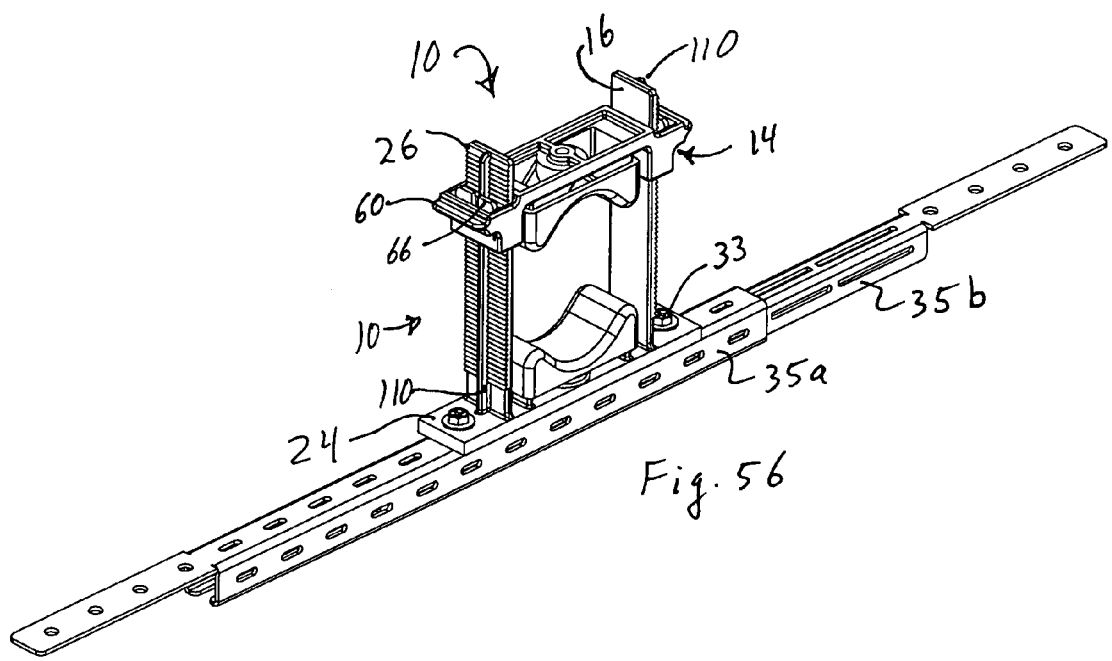
FIG. 56 is an upper perspective view of the bracket of FIG. 39 secured to a second mounting support.

Referring to FIGS. 55-56, the bracket 10 of this embodiment can be used with any of the support members 35 previously described. The base plate 24 is attached to the support member 35 by fasteners 33 extending through one or more holes 92. The embodiment of FIG. 56 is especially suitable for holding vertically oriented pipes, or for being fastened to a ceiling so the removable clamp bracket 14 supports the weight of the pipe. Preferably though, the bracket 10 is oriented so the weight of the pipe urges the bracket 10 toward the support member 35 rather than pulling the bracket 10 away from the support member 35.

Figure 68:
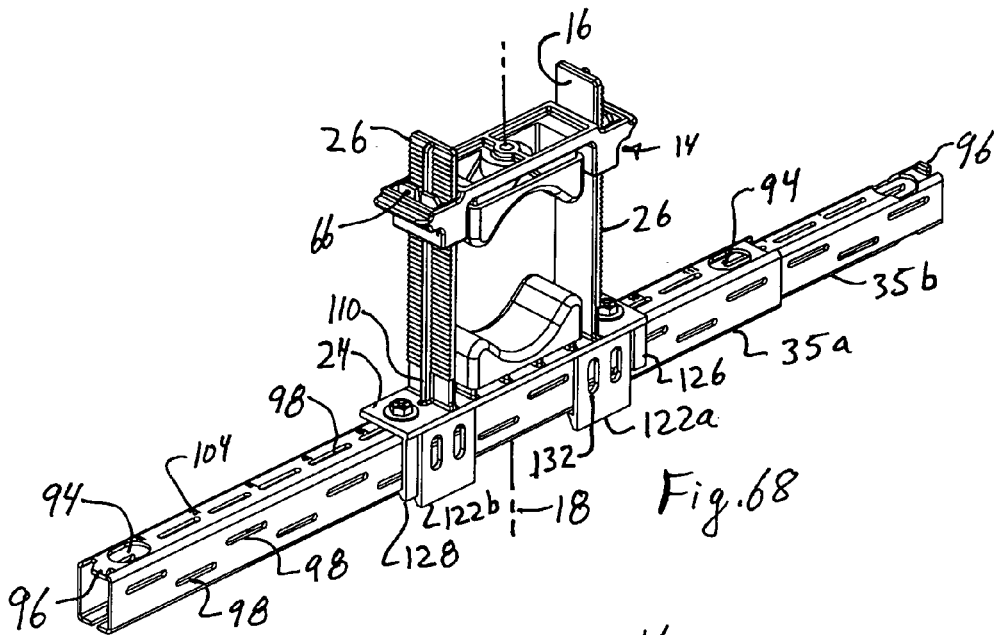
FIG. 68 is a perspective view of the bracket of FIG. 57 secured to a first mounting support.
Figure 69:
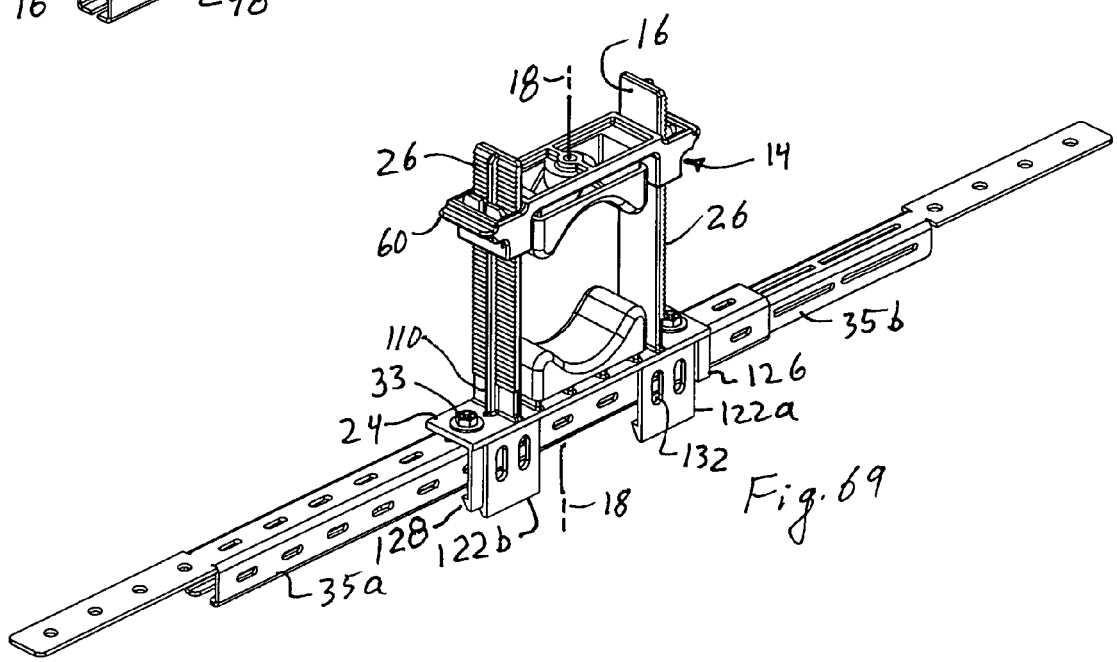
FIG. 69 is a perspective view of the bracket of FIG. 57 secured to a second mounting support.

A still further embodiment is shown in FIGS. 57-69. This further embodiment preferably, but optionally has the stiffening rib 110 described above, and has members extending from the base plate 24 to engage opposing sides of the support member sufficiently to temporarily hold the bracket 10 in position until a user securely fastens the bracket to the support member, as by fasteners 33. Whereas the embodiment of FIG. 1 uses one or more resilient members 38 opposite a flange 35 that is preferably stiff and relatively inflexible, the further embodiment of FIGS. 57-69 use a plurality of flexible members on opposing sides of the base plate 24 to engage opposing sides of the support bar 35. This is best seen in FIGS. 68-69. A plurality of different length members is provided in order to accommodate support members 35 of different sizes.

Referring to FIGS. 61-68, the resilient members advantageously take the form of flexible plates 120, 122(*a* and *b*) or flexible members 126, 128, each of which preferably has a catch or lip 130 which extends laterally of the plate or member a distance sufficient to engage the support member 35. Whether the resilient members are more akin to plates 120, 122, or whether the resilient members are more like resilient leaf springs 126, 128 can vary with the particular application. Each will be referred to hereafter as resilient member 120, 122, 126 or 128. The resilient members 120, 122, 126 and 128 are flexible, and that flexibility is provided primarily by the length and width and thickness of the members. They act as leaf springs to engage the lip 130 with the support bar 35. The members 120, 122, 126 and 128 are sufficiently flexible that they can be manipulated easily by hand.

One ore more of the members 120, 122, 126 or 128 preferably have holes 132 in them, with the holes aligned to coincide with the slots in the support member 35, such as slots 98. Elongated slots are preferred, but optional, and preferably extend enough to overlap each row of the staggered slots 98 so the fastener 33 can be inserted into either row of staggered slots. The holes 132 can affect the stiffness of the resilient members 120, 122, 126 or 128. As seen best in FIGS. 60 and 66, the members 120, 122, 126 and 128 are inclined toward the axis 18, and thus toward the center of the support member 35 to which the bracket 10 is fastened during use. As the resilient members 120, 122, 126 and 128 are bent outward to fit over the support member 35, the lips 130 on the resilient members 120, 122, 126 and 128 are urged against the support member 35 and are advantageously sized relative to the support member 35 so at least one lip 130 engages an edge of the support member 35.

The resilient members 120, 122, 126 or 128 are of differing length to allow the lips 130 to engage different sized support members. Resilient members 120, 122*a* and 122*b* are of the same length, but member 120 extends from the opposite side of support base 24 as members 122*a*, 122*b*. Resilient member 120 is between resilient members 122*a* and 122*b*. That allows a resilient engagement with the support member 35, on opposing sides of the support member.

The length of members 120, 122*a* and 122*b* are the same, and sized to fit over the long side of a rectangular support member 35. They are preferably sized to fit over the larger, outer support member 35*a*, although one or more of the resilient members could also be sized to fit over the smaller, inner support member 35*b*. The distal end of resilient members 120, 122*a* and 122*b* is preferably, but optionally, tapered or inclined to help the members fit over the outside of the support member 35. The lip 130 on the resilient members 120, 122*a* and 122*b* engage an edge of the support member 35 to at least temporarily hold the bracket 10 to the support member 35, allowing the user to use both hands to fasten the bracket to the support member 35.

The resilient member 126 is the shortest of the resilient members and is located at one end of the base plate 24. The resilient members 124 and 128 have lengths between the shortest and the longest members 126, 120, respectively. The resilient members 124, 126 and 128 have no corresponding resilient member of the same length on the opposite side of the base plate 24. Severe canting of the bracket 10 relative to the support member 35 is prevented because the resilient members 120, 122 are on opposing sides and straddle the support member 35 to limit canting or twisting of the bracket 10 relative to the support member 35. The shorter resilient members 124, 128 are advantageously on the ends of the support plate 24 so they can be more easily manipulated by hand to place the bracket 10 on the support member 35 or to remove it from the support member.

The location, length, and width and shape of the resilient members can vary. The support member 35*a* shown in FIG. 68 is rectangular, with the longer side of outer support member 35*a* being about one inch high and about ⅝ inch wide, and the lengths of resilient members 120, 122 are advantageously selected so the lips 130 on those resilient members can engage the edges of the support member 35*a*. The length of resilient member 128 is advantageously sized so the corresponding lip 130 on that resilient member can engage the inner support member 35*b*. The lengths of resilient members 124, 126 are advantageously selected so they can have the lips 130 on those resilient members engage the edges of the outer and inner support members, 35*a* and 35*b*, respectively, of the embodiment of support member 35 shown in FIG. 69. The interior member 35*b* of both embodiments of support member 35 is about ⅛ inch smaller in width and height than the outer support member 35*a*. Advantageously, the shortest of the resilient members 124, 126 are sized to fit the dimensions of square support member 35*a* shown in FIG. 69. The square support member 35 has outer support member which is about ½-⅝ inch wide and ½-⅝ inches high. The longer members 120, 122 and 128 extend beyond the support member 35 in FIG. 69 and do not engage it, although the length of the resilient members may abut the opposing sides of the support member 35 to prevent canting of the bracket 10 relative to the support member 35.

Referring to FIGS. 60, 66 the distal end of the resilient members 120, 122, 124, 126, 128 have a triangular shape when viewed from the side, so as to provide a tab or projection which may be engaged by a person's finger to manipulate the engaged resilient member. That helps release an engaged resilient member to remove the bracket 10 from a support member 35.

The resilient members 38, 120, 122, 124, 126 and 128 provide means for releasably holding the bracket 10 in position on the support member. The resilient members 38, 120, 122, 124, 126 and 128 also provide means for releasably fastening the bracket 10 to the support member if further fasteners 33 are not desired. The fasteners 33, and other fastening methods such as pins, clips, adhesives, solder, welding, etc. provide means for securing the bracket 10 to the support member 35 on a sturdier basis suitable for use of the bracket 10.

The distal end of the resilient members 120, 122, 126 and 128 are preferably sized so they do not allow the lip 132 to enter the slots 98 sufficiently to disrupt movement of the bracket 10. The tapered ends of the resilient members 120, 122, 126 and 128 could be longer than the width of the slots 98 so the lip 130 does not readily and fully engage the slot 98, or the distal ends could be wider than the slots are long. Alternatively, specifically sized openings such as slots 98 could be provided at predetermined locations and sized so the lips 130 engage the slots 98 in the walls of the support member 35 rather than engaging the edges of the support member 35.

Referring to FIGS. 35, 31-32, 55-56 and 68-69, a further embodiment of the support member 35 is described herein, as further modified in FIGS. 70-73. The telescoping sections 35a, 35b can sometimes slide too freely and a user will adjust the length of the support 35 to fit between two studs in a wall or ceiling, or between two suspended drop rods, only to have the sections 35a, 35b move relative to each other before they can be fastened in place. The embodiment shown in FIGS. 70-73 has a friction member 140 interposed between the nested or telescoped portions of the support member 35a, 35b in order to restrict relative motion of the portions. A leaf spring fastened to one member 35a, 35b, and having a distal end abutting the other of the support members 35a, 35b is preferred for the friction member 140. But other friction members could be used, such as a protrusion or dimple formed in one part 35a, 35b and located to abut the other, mating part 35a, 35b, or an elastomeric material interposed between the moving parts 35a, 35b.

The illustrated friction member 140 is advantageously, but optionally, formed by cutting an elongated C-shaped slot in one side of the inner structural support 35b, to form a flat, elongated leaf spring 142. A distal end 144 of the leaf spring 142 is deformed toward the other of the nested support members 35a. The distal end 144 is bent to allow the distal end to slide within the nested or telescoped portion of support member 35a, to prevent catching the parts. The telescoping nature of these nested support members 35 requires a close fit between the nested parts, and the leaf spring 140 is deformed enough to causes enough friction between the abutting spring 140 and the adjacent portion of the support member 35a to prevent the parts from sliding apart under their own weight or under movement by the user, but at a low enough friction that a user can adjust them to the desired length by moving the support member 35a relative to support member 35b.

The leaf spring 142 is shown formed on the inner member 35b, but it could be formed on the outer member 35a, or on both, or on multiple walls of either support member 35a, 35b. The leaf spring 142 is also shown formed on the wider side of a rectangular open-box section support member 35. But it could be formed on any of the sides as long as it is located to abut a corresponding wall on the adjacent support member 35 to create friction to limit motion of the parts unless sufficient force is applied. Because many of the walls of the support member have slots 98 or other openings in them, the location of the resilient member 140 is preferably selected so there is a continuous engagement between the resilient member 140 on one of the support members 35a, 35b, and the other of the adjacent support member 35a, 35b. In the illustrated embodiment the friction member 140 engages the opposing member between the parallel rows of slots 98.

Referring to FIGS. 70-71, a notch 148 is also formed in the end of the support member 35b opposite the stop member 96. A mating stop member 96 on the outer member 35b can enter and abut the notch.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of fastening the bracket 10 to the support 35 using various mechanisms and fasteners. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A clamp assembly for releasably securing an elongate member having a longitudinal axis to a structural support, the assembly comprising:

a clamp base having a pair of ratchet arms extending outward from the base, each arm having a plurality of ratchet teeth formed along at least one surface thereof and the arms being generally parallel, the clamp base having a first support for the elongate member that includes at least two inclined surfaces forming a generally V-shaped notch that opens in the same direction the arms extend, each of these inclined surfaces having an exterior side;

a clamping block having openings each of which is sized and located to receive one of the ratchet arms, the clamping block having a pawl located in each opening, the pawl having at least one pawl tooth with the pawl located and configured to releasably engage the ratchet teeth when the ratchet arm extends into the opening a distance sufficient to engage at least one pawl tooth, the clamping block having a second support for the elongate member that includes at least two inclined surfaces forming a generally V-shaped notch that opens toward the clamp base when the ratchet arms are inserted into the openings each of these inclined surfaces having an exterior side; and at least one cap sized and configured to be placed over the two inclined surfaces forming one of the V-shaped notches, the cap extending over that notch and over a portion of the exterior side of the corresponding inclined surface forming the notch and being interposed between the inclined surfaces and the elongate member during use of the clamp assembly.

2. The clamp assembly of claim 1, wherein the cap comprises a flexible cap forming a curved surface in the notch and held onto or secured to one of the first and second supports.

3. The clamp assembly of claim 2, comprising a cap on each of the clamp base and clamping block.

4. The clamp assembly of claim 1, wherein the cap is made of a material having a hardness of about 40-60 Shore A.

5. The clamp assembly of claim 2, wherein the cap is removable and wherein the V-shaped notches each have opposing sides and ends and the cap is secured to fit over the opposing exterior sides and ends of one of the V-shaped notches.

6. The clamp assembly of claim 1, further comprising a first hole extending through the clamp base, the first hole being located between the inclined surfaces of the base and sized to allow the passage of a fastener to fasten the base to the structural support during use of the clamp assembly.

7. The clamp assembly of claim 6, further comprising a second hole extending through the clamping block, the second hole being located between the inclined surfaces of the clamping block and sized to allow the passage of a fastener to fasten the clamping block to the structural support during use of the clamp assembly.

8. The clamp assembly of claim 7, wherein the first and second holes are co-axial.

9. The clamp assembly of claim 1, further comprising a second hole extending through the clamping block, the second hole being located between the inclined surfaces of the clamping block and sized to allow the passage of a fastener to fasten the clamping block to the structural support during use of the clamp assembly.

10. The clamp assembly of claim 9, further comprising at least one resilient leg and a flange each extending from the base in a direction opposite the ratchet arms, the flange and arms being spaced apart a distance sufficient to allow the leg to resiliently engage the support when the flange abuts the support, during use of the clamp assembly, the resilient leg being sufficiently flexible so a user's finger can move the leg to engage and disengage the clamp from the support during use of the clamp assembly.

11. The clamp assembly of claim 10, wherein the elongate member comprises a plumbing pipe.

12. The clamp assembly of claim 1, further comprising a rib on at least one ratchet arm extending a substantial length of the arm to strengthen that arm, the rib located on a face of the arm containing the ratchet teeth and having ratchet teeth on opposing sides of the rib.

13. The clamp assembly of claim 1, further comprising at least one resilient leg and a flange each extending from the base in a direction opposite the ratchet arms, the flange and arms being spaced apart a distance sufficient to allow the leg to resiliently engage the support when the flange abuts the support, during use of the clamp assembly, the flange having at least one opening therethrough which opening is sized to allow passage of a fastener to fasten the flange to the support during use of the clamp assembly, the resilient leg being sufficiently flexible so a user's finger can move the leg to engage and disengage the clamp from the support member during use of the clamp assembly.

14. The clamp assembly of claim 1, further comprising at least one resilient leg and a flange each extending from the base in a direction opposite the ratchet arms, the flange and arms being spaced apart a distance sufficient to allow the leg to resiliently engage the support when the flange abuts the support, during use of the clamp assembly, the leg having a distal end that is directed away from the flange, the resilient leg being sufficiently flexible so a user's finger can move the leg to engage and disengage the clamp from the support member during use of the clamp assembly.

15. The clamp assembly of claim 1, further comprising a flange at right angles to the base and extending toward the arms, with at least one hole in the flange sized to allow passage of a fastener to fasten the base to the support during use of the clamp assembly.

16. The clamp assembly of claim 1, wherein each pawl is formed by two adjacent slots in a wall in the clamping block which wall defines a portion of the opening in which the pawl is located, the slots extending to an opening onto a distal edge of the clamping block opposite a base of the pawl, so the pawl is connected to the clamping block only at the base.

17. The clamp assembly of claim 1, further comprising the elongated member and wherein the elongate member comprises a plumbing pipe.

18. The clamp assembly of claim 1, wherein the at least one cap has opposing ends each abutting a different one of the inclined surfaces of a V-shaped notch and a center between the ends which center does not abut either inclined surfaces.

19. The clamp assembly of claim 1, wherein the inclined surfaces forming each V-shaped notch have opposing sides and ends, and the cap extends over those ends and sides.

20. A clamp assembly for releasably securing an elongate member having a longitudinal axis to a structural support, the assembly comprising:
a clamp base having a pair of arms extending outward from the base, each arm having a plurality of ratchet teeth formed along at least one surface thereof and the arms being generally parallel, the clamp base having a first support means for holding the elongate member during use of the clamp assembly;
a clamping block having openings each sized and located to receive one of the ratchet arms, the clamping block having a pawl located in each opening, the pawl having at least one pawl tooth, the pawl located and configured to releasably engage the ratchet teeth when the ratchet arm extends into the opening a distance sufficient to engage the at least one pawl tooth, the clamping block having second support means for supporting the elongate member during use of the clamping assembly; and
cap means cooperating with at least one of the first and second support means to support the elongated member during use of the clamp assembly, the cap means including means to hold or secure the cap to the support means.

21. The clamp assembly of claim 20, wherein the cap means further provides means for reducing acoustic noise.

22. The clamp assembly of claim 20, further comprising at least one resilient leg means on the base for releasably engaging a support during use of the clamping assembly by bending the resilient leg means with a finger.

23. The clamp assembly of claim 22, wherein one of the at least one leg means comprises a flange.

24. The clamp assembly of claim 20, further comprising hole means for fastening the base to a structural support during use of the clamping assembly.

25. The clamp assembly of claim 20, wherein the clamp base and clamping block are molded from the same material.

26. The clamp assembly of claim 20, wherein the pawl is formed in a wall of the clamping block which wall defines the opening, the pawl being formed by two parallel slots in the wall which slots extend to a distal edge of the opening.

27. The clamp assembly of claim 20, wherein the elongate member comprises a plumbing pipe.

28. The clamp assembly of claim 20, further comprising at least one resilient leg and a flange each extending from the clamp base in a direction opposite the ratchet arms, the flange and arms being spaced apart a distance sufficient to allow the leg to resiliently engage the support when the flange abuts the support, during use of the clamp assembly, the resilient leg being sufficiently flexible so a user's finger can move the leg to engage and disengage the clamp from the support during use of the clamp assembly.

29. A clamp assembly for holding a pipe having a longitudinal axis to a support, the assembly comprising:
   a clamp base having two parallel arms extending outward from the base;
   a clamp base pipe support extending outward from the clamp base in the same direction as the arms and located between the arms, the clamp base pipe support having two opposing ends with each end being adjacent one of the arms, the clamp base pipe support having a middle with the ends of the clamp base pipe support extending further outward than the middle;
   a clamping block having two holes therethrough, each hole sized and aligned to receive one of the arms;
   a latch mechanism in each hole on the clamping block located to releasably engage the arm received in that hole;
   a clamping block pipe support extending outward from the clamping block toward the clamp base during use of the clamp assembly, the clamping block pipe support having two opposing ends with each end of the clamping block pipe support being adjacent one of the holes in the clamping block, the clamping block pipe support having a middle with the ends of the clamping block pipe support extending further outward than the middle;
   a flange formed integral with the clamp base and extending outward from a first side of the clamp base in a direction opposite the arms;
   a member formed integrally with the clamp base and extending outward from a second side of the clamp base in a direction opposite the arms, the member being resiliently disposed toward the flange and being spaced apart from the flange by a distance less than a width of the support at a location where the clamp assembly is to be mounted during use of the clamp assembly in order to resiliently hold the clamping base to the support during use of the assembly.

30. The clamp assembly of claim 29, wherein the member has a distal end that is curved away from the flange.

31. The clamp assembly of claim 29, further comprising at least one of:
   a first cap engaging and extending between the two ends of the clamp base pipe supports to support the pipe during use of the clamp assembly; and
   a second cap engaging and extending between the ends of the clamping block pipe supports to support the pipe during use of the clamp assembly.

32. The clamp assembly of claim 29, wherein the latch mechanism comprises a pawl having a base forming a portion of a wall defining the hole, the pawl having sides defined by generally parallel slots in the wall and having a free end that extends outward from the clamping block a distance sufficient to be manually engaged to move the pawl, the pawl having at least one pawl tooth that releasably engages ratchet teeth on one of the arms to releasably hold the arm relative to the pawl and clamping block.

33. A clamp assembly for holding a pipe having a longitudinal axis to a support, the assembly being oriented along an axis orthogonal to the longitudinal axis, the assembly comprising:
   a clamp base;
   a clamping block;
   two parallel arms extending outward from one of the clamp base and the clamping block and located on opposing sides of the orthogonal axis during use of the clamp assembly;
   two holes in the other of the clamp base and the clamping block with each hole being sized and located to receive one of the arms, the two holes being located on opposing sides of the orthogonal axis during use of the clamp assembly;
   a clamp base pipe support extending outward from the clamp base, the clamp base pipe support having two opposing ends located on opposing sides of the orthogonal axis during use of the clamp assembly and located between that orthogonal axis and the arms and holes during use of the clamp assembly, the clamp base pipe support having a middle with the ends of the clamp base pipe support extending further outward than that middle;
   a clamping block pipe support extending outward from the clamping block toward the clamp base during use of the clamp assembly, the clamping block pipe support having two opposing ends located on opposing sides of the orthogonal axis during use of the clamp assembly and located between that orthogonal axis and the arms and holes during use of the clamp assembly, the clamping block pipe support having a middle with the ends of the clamping block pipe support extending further outward than that middle;
   a latch mechanism located in each hole to releasably engage the arm received in that hole;
   a flange extending outward from one of the clamp base and the clamping block, the flange extending in a direction opposite the arms;
   a member extending outward from the one of the clamp base and the clamping block from which the flange extends and generally parallel to the flange, the flange and member being located on a side of the one of the clamp base and clamping block that is opposite to the pipe support of the one of the clamp base and clamping block from which the flange and member extend, the member being resiliently disposed toward the flange and being spaced apart from the flange by a distance less than a width of the support at a location where the clamp assembly is to be mounted during use of the clamp assembly in order to resiliently hold one of the clamping base and clamping block to the support during use of the assembly.

34. The clamp assembly of claim 33, wherein the arms extend from the clamping block and the member resiliently holds the clamp base to the support.

35. The clamp assembly of claim 33, wherein the arms extend from the clamp base.

36. The clamp assembly of claim 35, further comprising at least one of:
   a first cap engaging and extending between the two ends of the clamp base pipe supports to support the pipe during use of the clamp assembly;
   a second cap engaging and extending between the ends of the clamping block pipe supports to support the pipe during use of the clamp assembly.

37. The clamp assembly of claim 33, wherein the member has a distal end that is curved away from the flange.

38. The clamp assembly of claim 33, further comprising at least one of:
   a first cap engaging and extending between the two ends of the clamp base pipe supports to support the pipe during use of the clamp assembly; and a second cap engaging and extending between the ends of the clamping block pipe supports to support the pipe during use of the clamp assembly.

39. The clamp assembly of claim 33, wherein the latch mechanism comprises a pawl having a base forming a portion of a wall defining the hole, the pawl having sides defined by generally parallel slots in the wall and having a free end that extends outward from the clamping block a distance sufficient to be manually engaged to move the pawl, the pawl having at least one pawl tooth that releasably engages ratchet teeth on one of the arms to releasably hold the arm relative to the pawl and clamping block.

40. A clamp assembly for releasably securing an elongate member having a longitudinal axis to a support, the assembly comprising:
 a clamp base having a pair of arms extending outward from the base, each arm having a plurality of ratchet teeth formed along at least one surface thereof and the arms being generally parallel, the clamp base having a first support means for holding the elongate member during use of the clamp assembly;
 a clamping block having openings each sized and located to receive one of the ratchet arms, the clamping block having a pawl located in each opening, the pawl having at least one pawl tooth, the pawl located and configured to releasably engage the ratchet teeth when the ratchet arm extends into the opening a distance sufficient to engage the at least one pawl tooth, the clamping block having second support means for supporting the elongate member during use of the clamping assembly;
 cap means cooperating with at least one of the first and second support means to support the elongated member during use of the clamp assembly and to hold or secure the cap to the second support means; and
 means for temporarily fastening the clamp base to the support during use of the clamp assembly.

41. The clamp assembly of claim 40, further comprising a rib on each of the arms extending a substantial length of each arm to strengthen the arms.

42. The clamp assembly of Clam 41, wherein the rib extends from the same side of the arm as the ratchet teeth with ratchet teeth on opposing sides of the rib and a pawl engages the teeth on each side of the rib.

* * * * *